(12) United States Patent  
Galitsky

(10) Patent No.: US 10,839,161 B2
(45) Date of Patent: Nov. 17, 2020

(54) TREE KERNEL LEARNING FOR TEXT CLASSIFICATION INTO CLASSES OF INTENT

(71) Applicant: Oracle International Corporation, Redwood Shores, CA (US)

(72) Inventor: Boris Galitsky, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 98 days.

(21) Appl. No.: 16/010,141

(22) Filed: Jun. 15, 2018

(65) Prior Publication Data

US 2018/0365228 A1 Dec. 20, 2018

Related U.S. Application Data

(60) Provisional application No. 62/520,458, filed on Jun. 15, 2017.

(51) Int. Cl.
G06F 40/30 (2020.01)
G06N 20/00 (2019.01)
G06N 5/00 (2006.01)
G06F 16/00 (2019.01)
G06N 20/10 (2019.01)
(Continued)

(52) U.S. Cl.
CPC .............. G06F 40/30 (2020.01); G06F 16/00 (2019.01); G06F 40/205 (2020.01); G06F 40/211 (2020.01); G06F 40/216 (2020.01); G06F 40/35 (2020.01); G06N 5/003 (2013.01);
(Continued)

(58) Field of Classification Search
CPC ....... G06F 40/30; G06F 40/205; G06F 40/211
See application file for complete search history.

(56) References Cited

U.S. PATENT DOCUMENTS 5,495,605 A   2/1996 Cadot
6,112,168 A   8/2000 Corston et al.
(Continued)

FOREIGN PATENT DOCUMENTS

WO   2015089822   6/2015

OTHER PUBLICATIONS

"First Action Interview Pilot Program Pre-Interview Communication" issued in U.S. Appl. No. 16/145,702, dated Feb. 7, 2019, 6 pages.
(Continued)

Primary Examiner — Samuel G Neway
(74) Attorney, Agent, or Firm — Kilpatrick Townsend & Stockton LLP

(57) ABSTRACT

Systems, devices, and methods of the present invention are related to determining an intent of an utterance. For example, an intent classification application accesses a sentence with fragments. The intent classification application creates a parse tree for the sentence. The intent classification application generates a discourse tree that represents rhetorical relationships between the fragments. The intent classification application matches each fragment that has a verb to a verb signature, thereby creating a communicative discourse tree. The intent classification application creates a parse thicket by combining the communicative discourse tree and the parse tree. The intent classification application determines an intent of the sentence from a predefined list of intent classes by applying a classification model to the parse thicket.

18 Claims, 26 Drawing Sheets

(51) Int. Cl.
  *G06N 5/02* (2006.01)
  *G06F 40/35* (2020.01)
  *G06F 40/205* (2020.01)
  *G06F 40/216* (2020.01)
  *G06F 40/211* (2020.01)

(52) U.S. Cl.
  CPC ............. *G06N 5/022* (2013.01); *G06N 20/00* (2019.01); *G06N 20/10* (2019.01)

(56) References Cited

U.S. PATENT DOCUMENTS

| | | |
|---|---|---|
| 6,181,909 B1 | 1/2001 | Burstein et al. |
| 6,731,307 B1 | 5/2004 | Strubbe et al. |
| 7,152,031 B1 | 12/2006 | Jensen et al. |
| 7,519,529 B1 | 4/2009 | Horvitz |
| 7,840,556 B1 | 11/2010 | Dayal et al. |
| 9,037,464 B1 | 5/2015 | Mikolov et al. |
| 9,292,490 B2 | 3/2016 | Kimelfeld et al. |
| 9,559,993 B2* | 1/2017 | Palakovich |
| 9,582,501 B1 | 2/2017 | Salmon et al. |
| 10,019,716 B1 | 7/2018 | Ainslie et al. |
| 10,599,885 B2 | 3/2020 | Galitsky |
| 2001/0007987 A1 | 7/2001 | Igata |
| 2002/0040292 A1 | 4/2002 | Marcu |
| 2002/0046018 A1* | 4/2002 | Marcu .................... G06F 40/30 704/9 |
| 2003/0138758 A1 | 7/2003 | Burstein et al. |
| 2004/0044519 A1 | 3/2004 | Polanyi et al. |
| 2004/0148170 A1 | 7/2004 | Acero et al. |
| 2005/0086592 A1 | 4/2005 | Polanyi et al. |
| 2007/0073533 A1 | 3/2007 | Thione et al. |
| 2007/0136284 A1 | 6/2007 | Cobb et al. |
| 2007/0192306 A1 | 8/2007 | Papakonstantinou et al. |
| 2007/0294229 A1 | 12/2007 | Au |
| 2008/0228467 A1 | 9/2008 | Womack et al. |
| 2009/0100053 A1 | 4/2009 | Boschee et al. |
| 2009/0248399 A1 | 10/2009 | Au |
| 2010/0169359 A1 | 7/2010 | Barrett et al. |
| 2011/0119049 A1 | 5/2011 | Ylonen |
| 2011/0153673 A1 | 6/2011 | Boschee et al. |
| 2013/0046757 A1 | 2/2013 | Salvetti et al. |
| 2013/0204611 A1 | 8/2013 | Tsuchida et al. |
| 2014/0040288 A1* | 2/2014 | Galitsky .............. G06F 16/248 707/755 |
| 2014/0122083 A1 | 5/2014 | Xiaojiang |
| 2014/0136188 A1 | 5/2014 | Wroczynski et al. |
| 2015/0039295 A1 | 2/2015 | Soschen |
| 2015/0046492 A1 | 2/2015 | Balachandran |
| 2015/0149461 A1 | 5/2015 | Aguilar Lemarroy et al. |
| 2015/0161512 A1 | 6/2015 | Byron et al. |
| 2016/0034457 A1 | 2/2016 | Bradley et al. |
| 2016/0055240 A1 | 2/2016 | Tur et al. |
| 2016/0085743 A1 | 3/2016 | Haley |
| 2016/0086601 A1 | 3/2016 | Chotimongkol et al. |
| 2016/0232152 A1 | 8/2016 | Mahamood |
| 2016/0246779 A1 | 8/2016 | Ho et al. |
| 2016/0247068 A1 | 8/2016 | Lin |
| 2017/0032053 A1 | 2/2017 | LeTourneau |
| 2017/0116982 A1 | 4/2017 | Gelfenbeyn et al. |
| 2017/0228368 A1 | 8/2017 | Carter et al. |
| 2017/0286390 A1 | 10/2017 | Yashpe et al. |
| 2018/0181648 A1 | 6/2018 | Chen |
| 2018/0189385 A1 | 7/2018 | Sun et al. |
| 2018/0314689 A1 | 11/2018 | Wang et al. |
| 2018/0365228 A1* | 12/2018 | Galitsky .............. G06F 40/205 |
| 2019/0005027 A1 | 1/2019 | He et al. |
| 2019/0057157 A1 | 2/2019 | Mandal et al. |
| 2019/0103111 A1 | 4/2019 | Tiwari et al. |

OTHER PUBLICATIONS

Chen, "Understanding Mental States in Natural Language", Proceedings of the 8th International Conference on Computational Semantics, Jan. 2009, pp. 61-72.

Ebrahim, "NLP Tutorial Using Python NLTK (Simple Examples)", DZone.com, Available Online at, URL: https://dzone.com/articles/nlp-tutorial-using-python-nltk-simple-examples, (Last Accessed Feb. 1, 2019), Sep. 24, 2017, pp. 1-10.

Ponti, "Machine Learning Techniques Applied to Dependency Parsing", University of Pavia, Available Online at, URL: https://vision.unipv.it/AI/AIRG/MachineLearningTechniquesAppliedToDependencyParsingRevised.pdf (Last Accessed Jan. 1, 2019), Oct. 2015, pp. 1-45.

U.S. Appl. No. 16/145,702, "First Action Interview Office Action Summary", dated Apr. 29, 2019, 8 pages.

Galitsky, "Discovering Rhetorical Agreement between a Request and Response", Dialogue & Discourse, vol. 8, No. 2, Dec. 1, 2017, pp. 167-205.

Galitsky et al., "On a Chat Bot Finding Answers with Optimal Rhetoric Representation", RANLP—Recent Advances in Natural Language Processing Meet Deep Learning, Nov. 10, 2017, pp. 253-259.

International Application No. PCT/US2019/015696, "International Search Report and Written Opinion", dated Apr. 23, 2019, 12 pages.

International Application No. PCT/US2019/031580, "International Search Report and Written Opinion", dated Jul. 5, 2019, 12 pages.

Radev, "A Common Theory of Information Fusion from Multiple Text Sources Step One: Cross-document Structure", In Proceedings of the 1st SIGdial workshop on Discourse and dialogue, SIGDIAL, vol. 10, 2000, pp. 74-83.

Traum, "Rhetorical Relations, Action and Intentionality in Conversation", Proceedings ACL SIG Workshop on Intentionality and Structure in Discourse Relations, Jun. 1993, pp. 132-135.

Malaysia Airlines Flight 17, Wikipedia, 2016, 38 pages.

Shadow Chairman of Investigative Committee, CrimeRussia, Available online at: https://crimerussia.com/corruption/tenevoy-direktor-skr/, Aug. 2016, 5 pages.

Airenti et al., Conversation and Behavior Games in the Pragmatics of Dialogue, Cognitive Science, vol. 17, No. 2, Apr.-Jun. 1993, pp. 197-256.

Allen et al., Analyzing Intention in Utterances, Artificial Intelligence, vol. 15, No. 3, Dec. 1980, pp. 143-178.

Aurora, Freudian Metaphor and Surrealist Metalanguage in Michel Leiris' Failles: The Unconscious and the Sea, Litte Realite, vol. 13, 2001, 10 pages.

Belts, Dialogue Acts: One or More Dimensions?, Tech Report ISSCO Working paper No. 62, University of Geneva, 2005, 46 pages.

Bengio et al., A Neural Probabilistic Language Model, Journal of Machine Learning Research, vol. 3, Feb. 3, 2003, pp. 1137-1155.

Blaylock, Managing Communicative Intentions in Dialogue Using a Collaborative Problem-Solving Model, The University of Rochester, Computer Science Department, Apr. 2002, 56 pages.

Blaylock et al Managing Communicative Intentions With Collaborative Problem Solving, In Current and New Directions in Discourse and Dialogue, 2003, pp. 63-84.

Boni, Using Logical Relevance for Question Answering, Journal of Applied Logic, vol. 5, No. 1, Mar. 2007, pp. 92-103.

Carlson et al., Discourse Tagging Reference Manual, Available Online at: https://www.isi.edu/~marcu/discourse/tagging-ref-manual.pdf, Sep. 2001, 87 pages.

Cohen, Enron Email Dataset, Available online at: https://www.cs.cmu.edu/~enron/, Jul. 10, 2016, 1 page.

Cohen et al., Intention is Choice with Commitment, Artificial Intelligence, 1990, pp. 213-261.

Collins et al., Convolution Kernels for Natural Language, NIPS'01 Proceedings of the 14th International Conference on Neural Information Processing Systems: Natural and Synthetic, 2002, 8 pages.

Cox et al., Metareasoning: A Manifesto, Association for the Advancement of Artificial Intelligence, 2007, 4 pages.

(56) References Cited

OTHER PUBLICATIONS

Cristea et al., Veins Theory: A model of Global Discourse Cohesion and Coherence, In C. Boitet & P. Whitelock (Eds.), 17th International Conference on Computational linguistics, 1998, pp. 281-285.
Croft et al., Search Engines—Information Retrieval in Practice, Pearson Education, 2009, 542 pages.
Cumby et al., On Kernel Methods for Relational Learning, ICML, 2003, pp. 107-114.
Dijkstra, Programming Considered as a Human Activity, Proc. IFIP Congress, 1965, 7 pages.
Feng et al., A Linear-Time Bottom-Up Discourse Parser with Constraints and Post-Editing, In Proceedings of the 52nd Annual Meeting of the Association for Computational Linguistics, Jun. 23-25, 2014, pp. 511-521.
Feng et al., Classifying Arguments by Scheme, In Proceedings of the 49th Annual Meeting of the Association for Computational Linguistics, vol. 1, Jun. 19-24, 2011, pp. 987-996.
Feng, RST-Style Discourse Parsing and Its Applications in Discourse Analysis, University of Toronto, 2015, 189 Pages.
Galitsky et al., Assessing Plausibility of Explanation and Meta-Explanation in Inter-Human Conflict, Engineering Application of AI, vol. 24 Issue 8, 2011, pp. 1472-1486.
Galitsky et al., Improving Text Retrieval Efficiency With Pattern Structures on Parse Thickets, Proceedings of the Workshop Formal Concept Analysis Meets Information Retrieval, ECIR, 2013.
Galitsky et al., Improving Trust in Automation of Social Promotion, Association for the Advancement of Artificial Intelligence, 2014, pp. 28-35.
Galitsky et al., Inferring the Semantic Properties of Sentences by Mining Syntactic Parse Trees, Data & Knowledge Engineering, vols. 81-82, Nov.-Dec. 2012, pp. 21-45.
Galitsky et al., Learning Communicative Actions of Conflicting Human Agents, Journal of Experimental & Theoretical Artificial Intelligence, vol. 20, No. 4, Dec. 2008, pp. 277-317.
Galitsky, Learning Parse Structure of Paragraphs and Its Applications in Search, Engineering Applications of Artificial Intelligence, vol. 32, Jun. 2014, pp. 160-184.
Galitsky, Machine Learning of Syntactic Parse Trees for Search and Classification of Text, Engineering Application of AI. vol. 26, Issue 3, Mar. 2012, pp. 1072-1091.
Galitsky, Natural Language Question Answering System: Technique of Semantic Headers, Advanced Knowledge International, vol. 2, 2003.
Galitsky et al., Parse Thicket Representations for Answering Multi-Sentence Search, International Conference on Conceptual Structures, 2013, pp. 13 pages.
Galitsky et al., Rhetoric Map of an Answer to Compound Queries, In Proceedings of the 53rd Annual Meeting of the 20 Association for Computational Linguistics and the 7'h International Joint Conference of Natural Language Processing, Jul. 26-31, 2015, pp. 681-686.
Galitsky et al., Text Classification into Abstract Classes Based on Discourse Structure, Proceedings of Recent Advances in Natural Language Processing, Sep. 7-9, 2015, pp. 200-207.
Galitsky et al., Text Integrity Assessment: Sentiment Profile vs Rhetoric Structure, CICLing-2015, Springer international Publishing, 2015, pp. 126-139.
Galitsky, Transfer Learning of Syntactic Structures for Building Taxonomies for Search Engines, Engineering Applications of Artificial Intelligence, vol. 26, Issue 10, Nov. 2013, pp. 2504-2515.
Galitsky, Using extended tree kernels to recognize metalanguage in text, Studies in Computational Intelligence, Feb. 2017, 26 pages.
Grefenstette et al., Multi-Step Regression Learning for Compositional Distributional Semantics, In Proceedings of the 26 Tenth International Conference on Computational Semantics. Association for Computational Linguistics, Mar. 2013, 11 pages.
Grefenstette, Towards a Formal Distributional Semantics: Simulating Logical Calculi with Tensors, University of Oxford, Apr. 2013, 10 pages.
Grosz et al., Attention, Intentions, and the Structure of Discourse, Computational Linguistics, vol. 12, No. 3, Jul.-Sep. 1986, pp. 175-204.
Grosz et al., Discourse Analysis, in Understanding Spoken Language, Elsevier North-Holland, 1978, pp. 234-268.
Haussler, Convolution Kernels on Discrete Structures, UCSB Technical Report, Jul. 8, 1999, 38 pages.
Hernault et al., A Sequential Model for Discourse Segmentation, Computational Linguistics and Intelligent Text Processing, 2010, pp. 315-326.
Houngbo et al., An Automated Method to Build a Corpus of Rhetorically-Classified Sentences in Biomedical Texts, Proceedings of the First Workshop on Argumentation Mining, Association for Computational Linguistics, Jun. 26, 2014, pp. 19-23.
Iruskieta et al., A Qualitative Comparison Method for Rhetorical Structures: Identifying Different Discourse Structures in Multilingual Corpora, Lang Resources & Evaluation, vol. 49, Issue 2, May 8, 2014, 47 pages.
Jansen et al., Discourse Complements Lexical Semantics for Nonfactoid Answer Reranking, In Proceedings of the 52nd Annual Meeting of the Association for Computational Linguistics, Jun. 23-25, 2014, pp. 977-986.
John et al., Estimating Continuous Distributions in Bayesian Classifiers, Proceedings of the Eleventh Conference on Uncertainty in Artificial Intelligence, 1995, pp. 338-345.
Joty et al., A Novel Discriminative Framework for Sentence-Level Discourse Analysis, EMNLP-CoNLL '12 Proceedings of the 2012 Joint Conference on Empirical Methods in Natural Language Processing and Computational Natural Language Learning, 2012, pp. 904-915.
Joty et al., CODRA: A Novel Discriminative Framework for Rhetorical Analysis, Computational Linguistics, vol. 41, No. 3, Mar. 18, 2015, pp. 385-435.
Joty et al., Combining Intra- and Multi-sentential Rhetorical Parsing for Document-level Discourse Analysis, 51st Annual Meeting of the Association for Computational Linguistics, Aug. 4-9, 2013, pp. 486-496.
Joty et al., Discriminative Reranking of Discourse Parses Using Tree Kernels, Proceedings of the 2014 Conference on Empirical Methods in Natural Language Processing, Oct. 25-29, 2014, pp. 2049-2060.
Jurafsky et al., Speech and Language Processing: An Introduction to Natural Language Processing, Computational Linguistics, and Speech Recognition, Upper Saddle River, NJ: Prentice Hall, 2000, pp. 719-761.
Kate et al., Learning to Transform Natural to Formal Languages, In Proceedings of the Twentieth National Conference on Artificial Intelligence, Jul. 2005, pp. 1062-1068.
Kim et al., Medevi: Retrieving Textual Evidence of Relations Between Biomedical Concepts From Medline, Bioinformatics, vol. 24, Issue 11, Jun. 1, 2008, pp. 1410-1412.
Kipper et al., A Large-scale Classification of English Verbs, Kluwer Academic Publishers, Springer Netherland Dec. 2006, 18 pages.
Kipper et al., Verbnet Overview, Extensions, Mappings and Applications, Proceedings on NAACL HL T 2009: Tutorials, Association for Computational Linguistics, 2009, pp. 13-14.
Kirschner et al., Linking the Thoughts: Analysis of Argumentation Structures in Scientific Publications, Proceedings of the 2nd Workshop on Argumentation Mining, Jun. 4, 2015, pp. 1-11.
Kohavi, A Study of Cross-Validation and Bootstrap for Accuracy Estimation and Model Selection, International Joint Conference on Artificial Intelligence, Aug. 1995, pp. 1137-1143.
Kong et al., Improve Tree Kernel-Based Event Pronoun Resolution with Competitive Information, Proceedings of the Twenty-Second International Joint Conference on Artificial Intelligence, vol. 3, 2011, pp. 1814-1819.
Kontos et al., Question Answering and Rhetoric Analysis of Biomedical Texts in the Aroma System, National and 42 Kapodistrian University of Athens, Unpublished Manuscript, 2006, 6 pages.
Lee et al., Deterministic Coreference Resolution Based on Entity-Centric, Precision-Ranked Rules, Computational Linguistics, vol. 39, No. 4, 2013, pp. 885-916.

(56) References Cited

OTHER PUBLICATIONS

Lee, Genres, Registers, Text Types, Domain, and Styles: Clarifying the Concepts and Navigating a Path through the BNC Jungle, Language Learning & Technology, vol. 5, Issue 3, Sep. 2001, pp. 37-72.
Levinsoz, Presumptive Meanings: the Theory of Generalized Conversational Implicature, Cambridge, MA: The MIT Press, 2000, 11 pages.
Li et al., Recursive Deep Models for Discourse Parsing, Computer Science Department, 2014, 10 pages.
Lin et al., Recognizing Implicit Discourse Relations in the Penn Discourse Treebank, Proceedings of the 2009 Conference on Empirical Methods in Natural Language Processing, vol. 1, Aug. 6-7, 2009, pp. 343-351.
Litman et al., A Plan Recognition Model for Subdialogues in Conversations, Cognitive Science, 1987, pp. 163-200.
Mann et al., Discourse Structures for Text Generation, ACL '84 Proceedings of the 10th International Conference on Computational Linguistics and 22nd annual meeting on Association for Computational Linguistics, 1984, pp. 367-375.
Mann et al., Rhetorical Structure Theory and Text Analysis, University of Southern California, Nov. 1989, 66 pages.
Mann et al., Rhetorical Structure Theory and Text Analysis, Discourse Description: Diverse linguistic analyses of a fund-raising text, 1992, pp. 39-78.
Mann et al., Rhetorical Structure Theory: Towards a Functional Theory of Text Organization, Text-Interdisciplinary Journal for the Study of Discourse, vol. 8, Issue 3, Jan. 1988, pp. 243-281.
Marcu, From Discourse Structures to Text Summaries, In Proceedings of the ACL Workshop on Intelligent Scalable Text Summarization, 1997, pp. 82-88.
Mikolov et al., Distributed Representations of Words Phrases and their Compositionality, In Advances on Neural Information Processing Systems, Oct. 2013, 9 pages.
Mitchell et al., Composition in Distributional Models of Semantics, Cognitive Science, vol. 34, Issue 8, 2010, pp. 1388-1429.
Mitocariu et al., Comparing Discourse Tree Structures, Computational Linguistics and Intelligent Text Processing: 14th International Conference, vol. 7816, Mar. 24-30, 2013, 11 pages.
Mochales et al., Argumentation Mining, Artificial Intelligence and Law, vol. 19, Issue 1, Mar. 2011, pp. 1-22.
Moore et al., MJRTY—A Fast Majority Vote Algorithm, Automated Reasoning, 1991, pp. 105-117.
Moschitti, Efficient Convolution Kernels for Dependency and Constituent Syntactic Trees, European Conference on Machine Learning, Sep. 2006, pp. 318-329.
Niggemeyer et al., Summarizing Text for Intelligent Communication, Dagstuhl Seminar Report 79, 30.12-17.12.93 (9350), 1995, 36 pages.
Ott et al., Finding Deceptive Opinion Spam by Any Stretch of the Imagination, in Proceedings of the 49th Annual Meeting of the Association for Computational Linguistics, vol. 1, Jun. 19-24, 2011, pp. 309-319.
Ott et al., Negative Deceptive Opinion Spam, In Proceedings of the 2013 Conference of the North American Chapter of the Association for Computational Linguistics, Jun. 9-14, 2013, pp. 497-501.
Peldszus et al., From Argument Diagrams to Argumentation Mining in Texts: A Survey, International Journal of Cognitive Informatics and Natural Intelligence, vol. 7, Issue 1, Jan. 2013, pp. 1-31.
Pendyala et al., Towards a Truthful World Wide Web from a Humanitarian Perspective, IEEE 2015 Global Humanitarian Technology Conference, Oct. 8-11, 2015, 7 pages.
Popescu et al., Logic-Based Rhetorical Structuring for Natural language Generation in Human-Computer Dialogue, TSD 2007, LNAI 4629, 2007, pp. 309-317.
Radev et al., Centroid-Based Summarization of Multiple Documents: Sentence Extraction, Utility-Based Evaluation, 60 and User Studies, In Proceedings of the 2000 NAACL-ANLP Workshop on Automatic summarization, vol. 4, 2000, 8 pages.
Recasens et al., The Life and Death of Discourse Entities, In Proceedings of NAACL-HLT, Jun., 2013, pp. 627-633.
Reed et al., Language Resources for Studying Argument, Proceedings of the 6th Conference on Language Resources and Evaluation, LREC2008, ELRA, 2010, pp. 2613-2618.
Reichman, Getting Computers to Talk Like You and Me, Discourse context, focus and semantics (an ATNmodel). Cambridge, Mass. London: MIT Press, Jul. 1985, pp. 35-49.
Ricoeur, The Rule of Metaphor: The Creation of Meaning in Language, University of Toronto Press, 1975, pp. 65-100.
Russell et al., Principles of Metareasoning, Artificial Intelligence, 1991, pp. 400-411.
Salton et al., Term-Weighting Approaches in Automatic Text Retrieval, Information Processing & Management, vol. 24, Issue 5, Nov. 1987, 23 pages.
Santhosh et al., Discourse Based Advancement on Question Answering System, International Journal on Soft Computing, Artificial Intelligence and Applications (IJSCAI), vol. 1, Issue 2, Oct. 2012, 12 pages.
Scholman et al., A Step-Wise Approach to Discourse Annotation: Towards a Reliable Categorization of Coherence 64 Relations, Categories of coherence relations in discourse annotation. Dialogue & Discourse, vol. 7, No. 2, 2016, 28 pages.
Searle, Speech Acts: An Essay in the Philosophy of Language, Cambridge University Press, Jan. 1969, pp. 22-53.
Socher et al., Learning Continuous Phrase Representations and Syntactic Parsing With Recursive Neural Networks, Stanford University, 2010, 9 pages.
Sperber et al., Relevance: Communication and Cognition, Blackwell, Oxford and Harvard University Press, Cambridge, MA, 1986, 331 pages.
Sun et al., Exploring Syntactic Structural Features for Sub-Tree Alignment Using Bilingual Tree Kernels, ACL '10 Proceedings of the 48th Annual Meeting of the Association for Computational Linguistics, Jul. 2010, pp. 306-315.
Sun et al., Tree Sequence Kernel for Natural Language, Proceedings of the Twenty-Fifth AAAI Conference on Artificial Intelligence, 2011, 6 pages.
Surdeanu et al., Two Practical Rhetorical Structure Theory Parsers, In Proceedings of the Conference of the North American Chapter of the Association for Computational Linguistics—Human Language Technologies, Jun. 5, 2015, pp. 1-5.
Traum et al., Conversation Acts in Task-Oriented Spoken Dialogue, University of Rochester Computer Science, Computational Intelligence, vol. 8, No. 3, Aug. 1992, 31 pages.
Traum et al., Discourse Obligations in Dialogue Processing, In Proceedings of the 32nd annual meeting on Association for Computational Linguistics (ACL '94). Association for Computational Linguistics, 1994, pp. 1-8.
Tsui, English Conversation. Describing English Language Series, London: Oxford University Press, 1994, pp. 159-193.
Uliyar, A Primer: Oracle Intelligent Bots, Powered by artificial intelligence, White Paper, Sep. 2017, 28 pages.
Vapnik, The Nature of Statistical Learning Theory, Spring Science + Business Mediak LLC, 1995.
Walker et al., Quantitative and Qualitative Evaluation of Darpa Communicator Spoken Dialogue Systems, Discourse Analysis in Understanding Spoken Language, Proc. ACL, 2001, pp. 515-522.
Wang et al., Kernel Based Discourse Relation Recognition with Temporal Ordering Information, In Proceedings of the 48'h annual meeting of the Association for Computational Linguistics, Jul. 11-16, 2010, pp. 710-719.
Wu et al., Enhancing Text Representation for Classification Tasks With Semantic Graph Structures, International Journal of Innovative Computing, Information and Control, vol. 7, No. 5 (B), May 2011, pp. 2689-2698.
Yessenalina et al., Compositional Matrix-Space Models for Sentiment Analysis, Proceedings of the 2011 Conference on Empirical Methods in Natural Language Processing, Jul. 27-31, 2011, pp. 172-182.

(56) References Cited

OTHER PUBLICATIONS

Zanzotto et al., Estimating Linear Models for Compositional Distributional Semantics, In Proceedings of the 23 International Conference on Computational Linguistics (COLING), Aug. 23-27, 2010, pp. 1263-1271.

Zhang et al., Semantic Role Labeling Using a Grammar-Driven Convolution Tree Kernel, IEEE Transactions on Audio Speech and Language Processing, vol. 16, No. 7, Sep. 2008, pp. 1315-1329.

Zhao et al., Facilitating Discourse Analysis with Interactive Visualization, IEEE Transactions on Visualization and Computer Graphics, vol. 18, No. 12, 2012, pp. 2639-2648.

Exploring Dialog Management for Bots, Chatbots Magazine, Available on Internet at: https://chatbotsmagazine.com/exploring-dialog-management-for-bots-cbb8665a2fd3, Jul. 11, 2016, 7 pages.

Ignore, Deny, Downplay: Accounts of Syrians from Douma Have No Place in Western Narrative, Russia Today, Available online at: https://www.rt.com/news/425438-douma-witnesses-gas-attack-syria/, Apr. 28, 2018, 8 pages.

Welcome to Apache Lucene, Apache Lucene 7.5.0 and Apache Solr 7.5.0, Available online at: www.lucene.apache.org, Sep. 24, 2018, 38 pages.

Chali et al., Complex Question Answering: Unsupervised Learning Approaches and Experiments, Journal of Artificial Intelligence Research, vol. 35, May 2009, pp. 1-47.

De Mori et al., Spoken Language Understanding, IEEE Signal Processing Magazine, vol. 25, Issue 3, May 2008, pp. 50-58.

Feng et al., Distributional Footprints of Deceptive Product Reviews, Proceedings of the Sixth International AAAI Conference on Weblogs and Social Media, The AAAI Press, 2012, pp. 98-105.

Feng et al., Syntactic Stylometry for Deception Detection, In ACL 12, Proceedings of the 50th Annual Meeting of the Association for Computational Linguistics, Jul. 8-14, 2012, pp. 171-175.

Finn, A Question Writing Algorithm, Journal of Reading Behavior, VII, vol. 4, 1975, pp. 341-367.

Fornaciari et al., Identifying Fake Amazon Reviews as Learning from Crowds, In Proceedings of the 14th Conference of the European Chapter of the Association for Computational Linguistics, Apr. 26-30, 2014, pp. 279-287.

Galitsky et al., Concept-Based Learning of Human Behavior for Customer Relationship Management, Information Sciences, vol. 181, No. 10, May 15, 2011, pp. 2016-2035.

Galitsky, Learning Noisy Discourse Trees, Computational Linguistics and Intellectual Technologies, Proceedings of the International Conference Dialogue 2017. Available online at: http://www.dialog-21.ru/media/3911/galitskyb.pdf, May 31-Jun. 3, 2017, 14 pages.

Hai et al., Deceptive Review Spam Detection via Exploiting Task Relatedness and Unlabeled Data, In Proceedings of the 2016 Conference on Empirical Methods in Natural Language Processing, Nov. 1-5, 2016, pp. 1817-1826.

Makhalova et al., Pattern Structures for News Clustering, In Proceedings of the 4th International Conference on What can FCA do for Artificial Intelligence, vol. 1430, 2015, pp. 35-42.

Mercier et al., Why Do Humans Reason? Arguments for an Argumentative Theory, Behavioral and Brain Sciences, vol. 34, No. 2, Apr. 2011, pp. 57-111.

Mukherjee et al., Fake Review Detection: Classification and Analysis of Real and Pseudo Reviews, Technical Report, Department of Computer Science, 2013, 11 pages.

Mukherjee et al., What Yelp Fake Review Filter Might Be Doing? In Proceedings of the Seventh International AAAI Conference on Weblogs and Social Media, 2013, pp. 409-418.

International Application No. PCT/US2018/053392, International Search Report and Written Opinion dated Dec. 17, 2018, 11 pages.

Rayana et al., Collective Opinion Spam Detection: Bridging Review Networks and Metadata, In Proceedings of the 21th ACM SIGKDD International Conference on Knowledge Discovery and Data Mining, ACM, Aug. 11-14, 2015, 10 pages.

Salton et al., On the Specification of Term Values in Automatic Indexing, Journal of Documentation, Jun. 1973, 35 pages.

Sjoera, The linguistics Behind Chat Bots, iCapps, Available online at: http://www.icapps.com/the-linguistics-behind-chatbots/, Feb. 22, 2017, 9 pages.

Sun et al., Exploiting Product Related Review Features for Fake Review Detection, Mathematical Problems in Engineering, vol. 2016, Jul. 4, 2016, 7 pages.

Trstenjak et al., KNN with TF-IDF Based Framework for Text Categorization, Procedia Engineering, vol. 69, 24th DAAAM International Symposium on Intelligent Manufacturing and Automation, 2014, pp. 1356-1364.

Van Der Wees et al, Five Shades of Noise: Analyzing Machine Translation Errors in User-Generated Text, Proceedings of the ACL, Workshop on Noisy User-generated Text, Jul. 2015, pp. 28-37.

Wang et al., Using Learning Analytics to Understand the Design of an Intelligent Language Tutor—Chatbot Lucy, (IJACSA) International Journal of Advanced Computer Science and Applications, vol. 4, No. 11, 2013, pp. 124-131.

Yao et al., Online Deception Detection Refueled by Real World Data Collection, In Proceedings of Recent Advances in Natural Language Processing, Jul. 28, 2017, 10 pages.

U.S. Appl. No. 15/975,683, Non-Final Office Action dated Mar. 19, 2020, 16 pages.

U.S. Appl. No. 15/975,683, Non-Final Office Action dated Oct. 31, 2019, 27 pages.

U.S. Appl. No. 15/975,685, Non-Final Office Action dated Nov. 15, 2019, 23 pages.

U.S. Appl. No. 16/010,091, Notice of Allowance dated Mar. 19, 2020, 13 pages.

U.S. Appl. No. 16/010,156, Notice of Allowance dated Nov. 7, 2019, 13 pages.

U.S. Appl. No. 16/145,702, Final Office Action dated May 6, 2020, 19 pages.

Artooras et al., "Stanford NLP-VP vs NP", Stack Overflow Website, Available online at: https://stackoverflow.com/questions/35872324/stanford-nlp-vp-vs-np/35887762, Mar. 8-9, 2016, 2 pages.

Collins et al., "New Ranking Algorithms for Parsing and Tagging: Kernels Over Discrete Structures, and the Voted Perceptron", Proceedings of the 40th Annual Meeting of the Association for Computational Linguistics (ACL), Philadelphia, Jul. 2002, pp. 263-270.

Galitsky et al., "Finding Maximal Common Sub-Parse Thickets for Multi-Sentence Search", Graph Structures for Knowledge Representation and Reasoning, 2014, 19 pages.

Galitsky et al., "Style and Genre Classification by Means of Deep Textual Parsing", Computational Linguistics and Intellectual Technologies: Proceedings of the International Conference "Dialogue 2016", Jun. 2016, pp. 1-45.

Galitsky et al., "Text Classification Based on Deep Textual Parsing", Available Online at: http://ceur-ws.org/Vol-1886/paper_8.pdf, 2011, 9 pages.

Hara et al., "Exploring Difficulties in Parsing Imperatives and Questions", Proceedings of the 5th International Joint Conference on Natural Language Processing, Nov. 8-13, 2011, pp. 749-757.

Johnson et al., "The FrameNet Tagset for Frame-Semantic and Syntactic Coding of Predicate-Argument Structure", Proceedings of the First Meeting of the North American Chapter of the Association for Computational Linguistics, Apr. 2000, pp. 56-62.

Kittredge et al., "An Advanced English Grammar with Exercises", The Athenaeum Press, 1913, 266 pages.

Marcu et al., "An Unsupervised Approach to Recognizing Discourse Relations", Proceedings of the 40th Annual Meeting of the Association for Computational Linguistics (ACL), 2002, 8 pages.

Plotkin , "A Note on Inductive Generalization", Machine Intelligence 5, Chapter 8, 1970, pp. 153-163.

Tai et al., "Improved Semantic Representations from Tree-Structured Long Short-Term Memory Networks", Available Online at: https://arxiv.org/pdf/1503.00075.pdf, May 30, 2015, 11 pages.

U.S. Appl. No. 16/260,930, Non-Final Office Action dated Aug. 12, 2020, 9 pages.

* cited by examiner

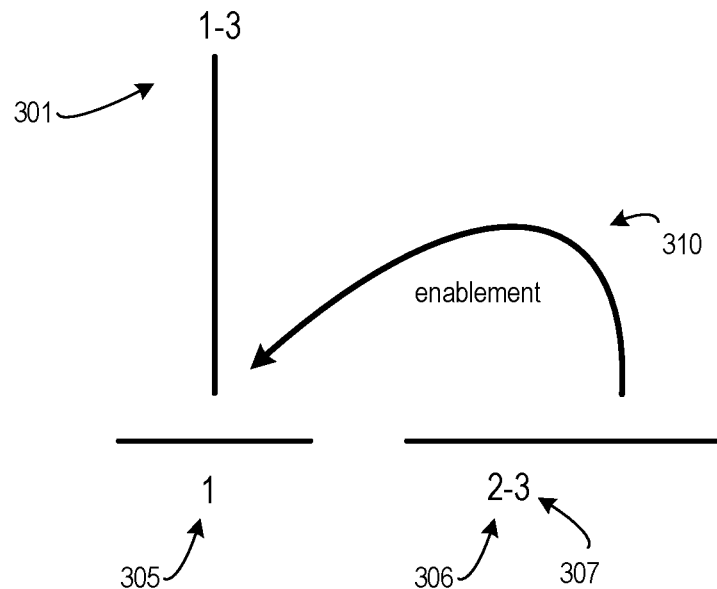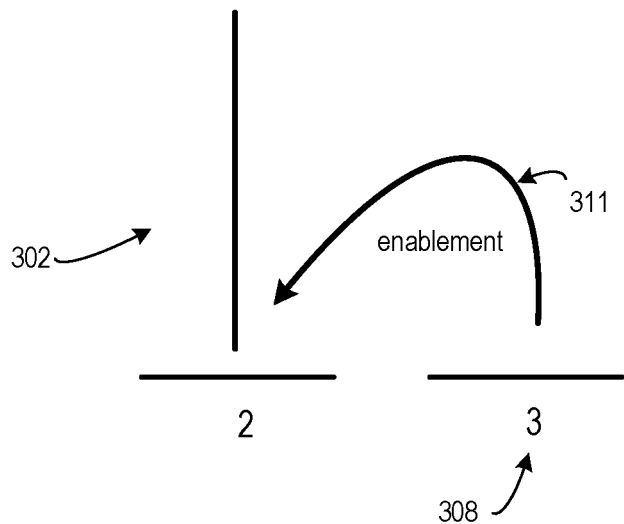
FIG. 3

{Elaboration}[N][S]
  {Elaboration}[N][S]
    {Attribution}[N][S]
      602 — "Teixon Corp. said"
      {Joint}[N]
        603 — "its vice president for manufacturing resigned"
        604 — "and its Houston work force has been trimmed by 40 people, or about 15%."
    {Attribution}[S][N]
      "The maker of hand-held computers and computer systems said"
      {Enablement}[N][S]
        "the personnel changes were needed"
        "to improve the efficiency of its manufacturing operation."
  {Attribution}[S][N]
    "The company said"
    {Elaboration}[N][S]
      "it hasn't named a successor to Ronald Button, the vice president"
      {Attribution}[S][N]
        "who resigned,"
        "its Houston work force now totals 230."

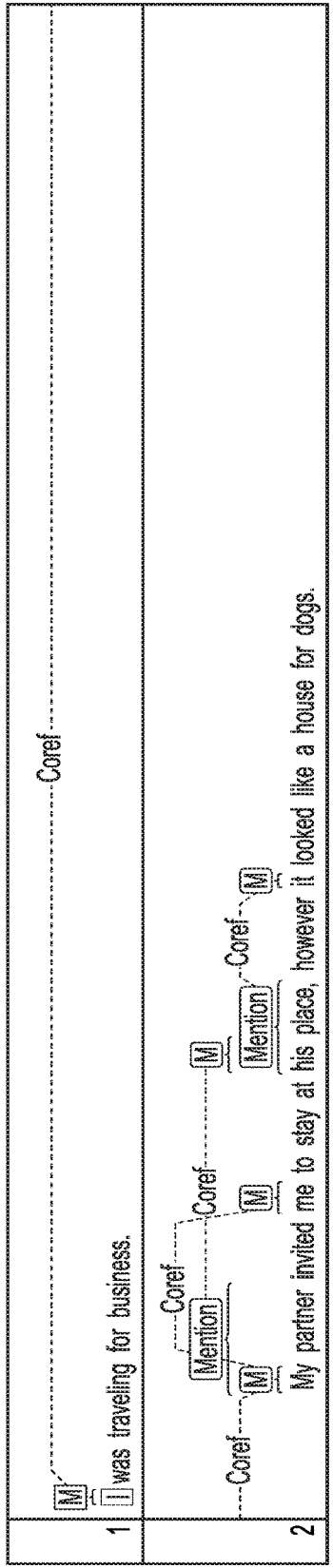
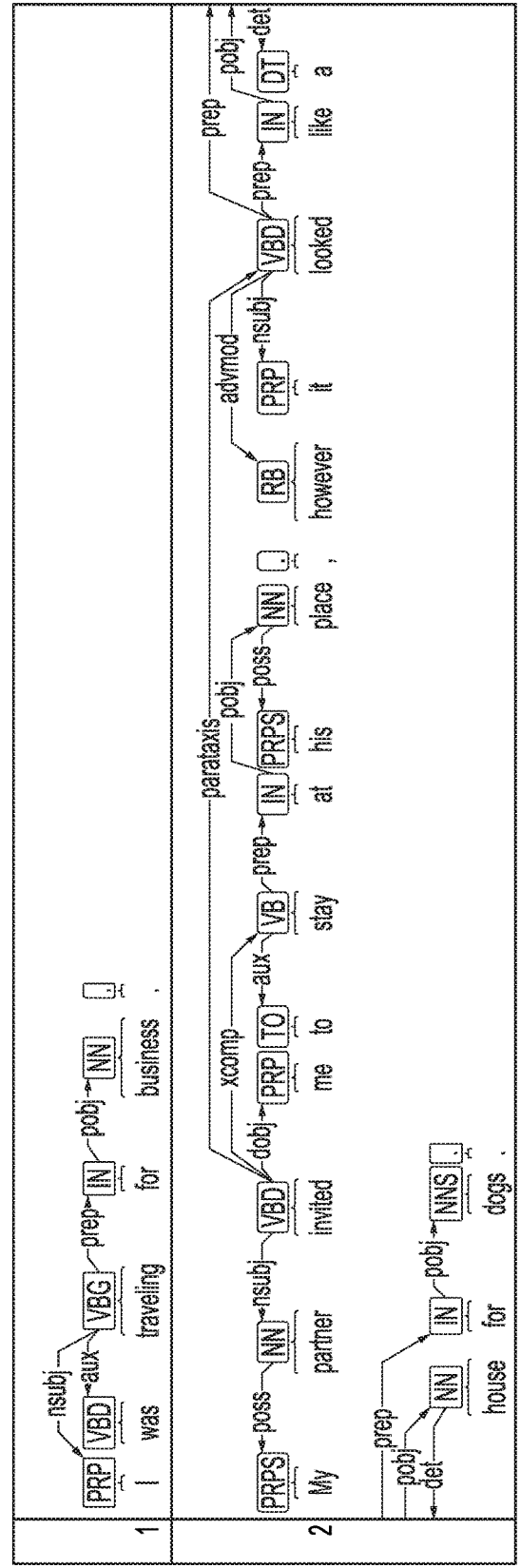
FIG. 19

TREE KERNEL LEARNING FOR TEXT CLASSIFICATION INTO CLASSES OF INTENT

CROSS-REFERENCES TO RELATED APPLICATIONS

This application claims the benefit of U.S. Provisional Application No. 62/520,458, filed Jun. 15, 2017, which is incorporated by reference in its entirety.

TECHNICAL FIELD

This disclosure is generally concerned with using linguistics to improve text classification. More specifically, this disclosure describes a system that uses discourse analysis to determine a class or an intent of a segment of text.

STATEMENT AS TO RIGHTS TO INVENTIONS MADE UNDER FEDERALLY SPONSORED RESEARCH AND DEVELOPMENT

Not Applicable

BACKGROUND

Text classification is useful in a variety of domains, such as autonomous agents (ChatBots), document analysis, security, language identification, spam filtering, etc. Content-based text classifiers receive text such as a document, email, or chat, analyze the text, and determine an intent of the text.

Learning an intent of text or an utterance has many applications. For example, automated agents can be more responsive to a user's question if the agent knows the user's intent. But intent is not always clear from a given piece of text. For example, a child may ask a parent "how much does this record cost" when the child really means "will you buy this record for me?" An intent can be one of a predefined list of intents such as software versus hardware, pop versus rock, or legal versus technical.

Solutions for text classification mostly use statistics derived from keywords in the text. But such solutions are insufficient to reliably determine a class of the document in part because classes of intent are usually weakly correlated with keywords. For example, many circumstances exist in which common keywords are shared across different classes, making such keyword-based solutions difficult. Additionally, keyword classification does not consider phrasing, style, or other document structure. Keyword classification is also not effective when classification is defined based on writing style as compared to topic.

Other solutions for recognizing intent match a sentence with a template labeled with a particular intent class from a training set. But such solutions suffer from low accuracy due to a limited training set size, inconsistency from domain to domain, and mixture of topical and structural classification features.

Accordingly, improved text classification systems are needed.

BRIEF SUMMARY

Generally, aspects determine an intent of an utterance by creating a communicative discourse tree from the utterance, creating a parse thicket from the communicative discourse tree and a parse tree from the sentence, and applying a classification model to the parse thicket.

Systems and methods herein determine an intent of an utterance. An intent classification application accesses a sentence including fragments. At least one fragment includes a verb and a plurality of words. Each fragment is an elementary discourse unit. The classification application creates a parse tree for the sentence. The classification application generates a discourse tree that represents rhetorical relationships between the fragments. The discourse tree includes nodes, each nonterminal node representing a rhetorical relationship between two of the fragments. Each terminal node of the nodes of the discourse tree is associated with one of the fragments. The classification application matches each fragment that has a verb to a verb signature, thereby creating a communicative discourse tree. The classification application creates a parse thicket by combining the communicative discourse tree and the parse tree and determines an intent of the sentence from a predefined list of intent classes by applying a classification model to the parse thicket.

The intent classification application can additionally select, based on the determined intent, an additional classification model from a hierarchy of classification models. The intent classification application can determine an additional intent of the sentence from an additional predefined list of intent classes by applying the additional classification model to the parse thicket.

The intent classification application can receive, from a user device, an indication that the determined intent is incorrect. The intent classification application crates a training pair comprising the sentence and an expected intent. The intent classification application re-trains the classification model by applying the training pair to the classification model.

The classification model can be a support vector machine or a support vector machine using tree-kernel learning.

The intent classification application can further train classification model in an iterative manner. The intent classification application provides, to the classification model, a training pair from a training set of training pairs. Each training pair is associated with an intent and includes a parse thicket and an expected probability. The parse thicket represents a first sentence with the respective intent and a second sentence without the respective intent. The intent classification application receives, from the classification model, a probability. The intent classification application calculates a loss function by calculating a difference between the probability and the respective expected probability. The intent classification application adjusts internal parameters of the classification model to minimize the loss function.

The intent classification application can access a set of training data including a set of training pairs. Each training pair is associated with an intent and includes a parse thicket for a sentence with the respective intent and a second sentence without the respective intent. The intent classification model can iteratively provide one of the training pairs to the classification model, receive, from the classification model, a probability, calculate a loss function by calculating a difference between the probability and the respective expected probability, and adjust internal parameters of the classification model to minimize the loss function.

The intent classification application can further receive, from the classification model, a prediction of intent, receive, from an external device, an indication of a correctness of the prediction; and adjust the internal parameters of the classification model based on the indication.

The above methods can be implemented as tangible computer-readable media and/or operating within a computer processor and attached memory.

BRIEF DESCRIPTION OF THE DRAWINGS

FIG. 3 depicts a further example of a discourse tree in accordance with an aspect.

FIG. 6 depicts an exemplary indented text encoding of the representation in FIG. 5 in accordance with an aspect.

FIG. 19 depicts an exemplary parse tree and respective relations for two sentences, according to certain aspects of the present disclosure.

DETAILED DESCRIPTION

Figure 1:
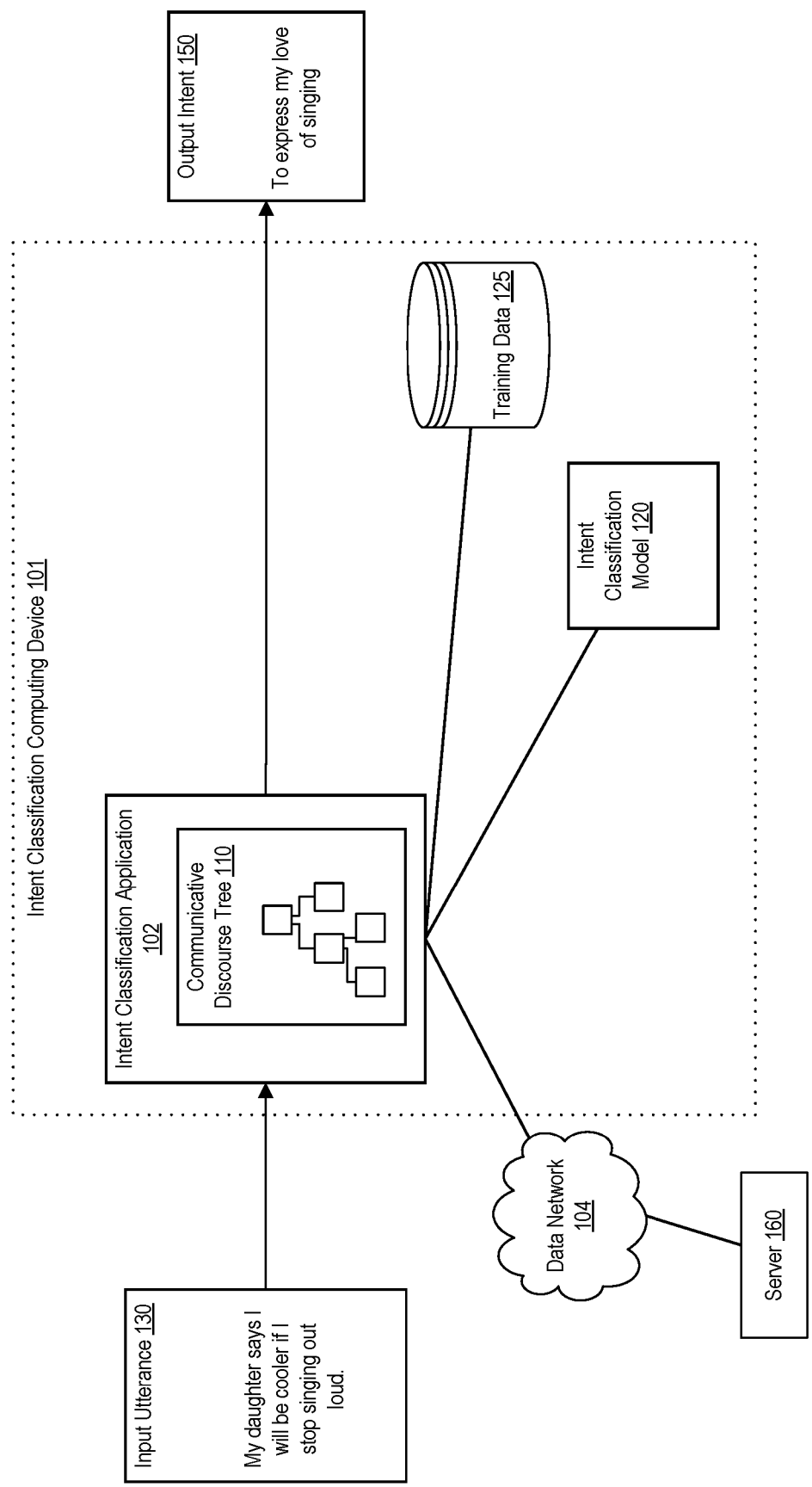
FIG. 1 shows an exemplary intent classification environment, in accordance with an aspect.

Aspects described herein improve electronic text classification systems by more accurately determining an intent of a speaker or writer of sentence or an utterance than possible with traditional keyword-based solutions. More specifically, by representing text as communicative discourse trees (CDTs) and using machine learning, aspects described herein automatically determine an intent in a sentence or utterance from a predefined set of intents.

"Communicative discourse trees" or "CDTs" include discourse trees that are supplemented with communicative actions. A communicative action is a cooperative action undertaken by individuals based on mutual deliberation and argumentation.

Intent is not always clear from the text of a sentence. For example, the question "how much is this book?" can be interpreted literally as a question about the cost of the book in dollars, or can be interpreted as, for example, when posed by a child to an adult, as "can you buy me this book?" Accurately obtaining an intent of an utterance or a sentence helps autonomous agents and other computing systems operate more effectively.

In an example, an intent classification system receives a question from a customer inquiring about a bank account such as "why was I charged these administrative fees?" As can be seen, the question can be interpreted literally as a question about the bank's policy, or interpreted as "please remove these administrative fees from my account [or else, I'll close my account]" or similar.

The intent classification system creates a communicative discourse tree from the question and combining the communicative discourse tree with a parse tree of the question into a parse thicket. A parse thicket is a combination of parse trees for sentences with discourse-level relationships between words and parts of the sentence in one graph. The intent classification system provides the communicative discourse tree to a classification model that is trained to predict an intent from a set of intent classes. The classification model outputs an intent such as "perform an action (request)", "provide information (FAQ)," or "switch to a human agent."

Additionally, aspects disclosed herein use nested, or hierarchical levels of intent to determine a first, broad, class of intent, and a second, narrower class of intent within the first class. Continuing with the banking example, an autonomous agent system may receive a question from a customer that asks about a bank account. The system provides the question to a first classifier, that determines that the user is in fact asking about an existing account not opening a new product. The system may then provide the question to a second classifier that determines specifically to what the question relates in the realm of banking such as a withdrawal, a transfer, or closing an account.

Technical advantages of some aspects include improved systems and methods of text classification. As discussed, solutions for text classification mostly use statistics derived from keywords in the text. But such solutions are insufficient to reliably determine a class of the document in part because classes of intent are usually weakly correlated with keywords. For example, many circumstances exist in which common keywords are shared across different classes, making such keyword-based solutions difficult. Additionally, keyword classification does not consider phrasing, style, or other document structure. Keyword classification is also not effective when classification is defined based on writing style as compared to topic. Other solutions for recognizing intent match a sentence with a template labeled with a particular intent class from a training set. But such solutions suffer from low accuracy due to a limited training set size, inconsistency from domain to domain, and mixture of topical and structural classification features.

More specifically, aspects described herein use communicative discourse trees. Communicative discourse trees combine rhetoric information with communicative actions. By incorporating labels that identify communicative actions, learning of communicative discourse trees can occur over a richer features set than simply rhetoric relations and syntax of elementary discourse units (EDUs). With such a feature set, additional techniques such as classification can be used to determine a rhetoric relationship between texts, thereby enabling improved document classifications systems.

Certain Definitions

As used herein, "rhetorical structure theory" is an area of research and study that provided a theoretical basis upon which the coherence of a discourse could be analyzed.

As used herein, "discourse tree" or "DT" refers to a structure that represents the rhetorical relations for a sentence of part of a sentence.

As used herein, a "rhetorical relation," "rhetorical relationship," or "coherence relation" or "discourse relation" refers to how two segments of discourse are logically connected to one another. Examples of rhetorical relations include elaboration, contrast, and attribution.

As used herein, a "sentence fragment," or "fragment" is a part of a sentence that can be divided from the rest of the sentence. A fragment is an elementary discourse unit. For example, for the sentence "Dutch accident investigators say that evidence points to pro-Russian rebels as being responsible for shooting down the plane," two fragments are "Dutch accident investigators say that evidence points to pro-Russian rebels" and "as being responsible for shooting down the plane." A fragment can, but need not, include a verb.

As used herein, "signature" or "frame" refers to a property of a verb in a fragment. Each signature can include one or more thematic roles. For example, for the fragment "Dutch accident investigators say that evidence points to pro-Russian rebels," the verb is "say" and the signature of this particular use of the verb "say" could be "agent verb topic" where "investigators" is the agent and "evidence" is the topic.

As used herein, "thematic role" refers to components of a signature used to describe a role of one or more words. Continuing the previous example, "agent" and "topic" are thematic roles.

As used herein, "nuclearity" refers to which text segment, fragment, or span, is more central to a writer's purpose. The nucleus is the more central span, and the satellite is the less central one.

As used herein, "coherency" refers to the linking together of two rhetorical relations.

As used herein, "communicative verb" is a verb that indicates communication. For example, the verb "deny" is a communicative verb.

As used herein, "communicative action" describes an action performed by one or more agents and the subjects of the agents.

FIG. 1 shows an exemplary intent classification environment, in accordance with an aspect. FIG. 1. depicts input utterance 130, intent classification computing device 101, output intent 160, data network 104, and server 160. Intent classification computing model 101 includes intent classification application, which includes communicative discourse tree 110, intent classification model 120, and training data 125.

Intent classification computing device 101 can be any computing system such as desktop, laptop, or mobile device such as a mobile phone, smart phone, tablet, laptop, smart watch, and the like. Intent classification computing device 101 can access data network 104 in order to query databases, for example, to determine whether input document 130 is accessible on the Internet. Data network 104 can be any public or private network, wired or wireless network, Wide Area Network, Local Area Network, or the Internet.

Intent classification application 102 receives input utterance 130. An utterance is a fragment of speech. An utterance can be less than a whole sentence, a sentence, or more than a sentence. By using communicative discourse tree 110 and intent classification model 120, intent classification application 102 determines output intent 150.

Intent classification model 120 is trained with training data 125. Intent classification model can be any type of machine learning model such as a predictive model, a classifier, a SVM model, a Gradient Tree Booster, etc. As further described, intent classification application 102 trains intent classification model 120 with training data 125. In other aspects, intent classification application 102 receives a trained intent classification model 120 from an external system.

More specifically, in order to determine output intent 150 from input utterance 130, intent classification application 102 follows a series of steps. In an example, intent classification application 102 creates a parse tree for the utterance. The utterance contains one or more fragments. Intent classification application 102 generates a discourse tree that represents rhetorical relationships between the fragments. The discourse tree includes nodes, each nonterminal node representing a rhetorical relationship between two of the plurality of fragments and each terminal node of the nodes of the discourse tree is associated with one of the plurality of fragments. Intent classification application 102 matches each fragment that has a verb to a verb signature, thereby creating a communicative discourse tree.

Intent classification application 102 creates a parse thicket by combining the communicative discourse tree and the parse tree. From the parse tree, intent classification application 102 determines an output intent 150 from a predefined list of intent classes by applying intent classification model 120 to the parse thicket.

Rhetoric Structure Theory and Discourse Trees

Linguistics is the scientific study of language. For example, linguistics can include the structure of a sentence (syntax), e.g., subject-verb-object, the meaning of a sentence (semantics), e.g. dog bites man vs. man bites dog, and what speakers do in conversation, i.e., discourse analysis or the analysis of language beyond the sentence.

The theoretical underpinnings of discourse, Rhetoric Structure Theory (RST), can be attributed to Mann, William and Thompson, Sandra, "Rhetorical structure theory: A Theory of Text organization," Text-Interdisciplinary Journal for the Study of Discourse, 8(3):243-281, 1988. Similar to how the syntax and semantics of programming language theory helped enable modern software compilers, RST helped enabled the analysis of discourse. More specifically RST posits structural blocks on at least two levels, a first level such as nuclearity and rhetorical relations, and a second level of structures or schemas. Discourse parsers or other computer software can parse text into a discourse tree.

Rhetoric Structure Theory models logical organization of text, a structure employed by a writer, relying on relations between parts of text. RST simulates text coherence by forming a hierarchical, connected structure of texts via discourse trees. Rhetoric relations are split into the classes of coordinate and subordinate; these relations hold across two or more text spans and therefore implement coherence. These text spans are called elementary discourse units (EDUs). Clauses in a sentence and sentences in a text are logically connected by the author. The meaning of a given sentence is related to that of the previous and the following sentences. This logical relation between clauses is called the coherence structure of the text. RST is one of the most popular theories of discourse, being based on a tree-like discourse structure, discourse trees (DTs). The leaves of a DT correspond to EDUs, the contiguous atomic text spans. Adjacent EDUs are connected by coherence relations (e.g., Attribution, Sequence), forming higher-level discourse units. These units are then also subject to this relation linking. EDUs linked by a relation are then differentiated based on their relative importance: nuclei are the core parts of the relation, while satellites are peripheral ones. As discussed, in order to determine accurate request-response pairs, both topic and rhetorical agreement are analyzed. When a speaker answers a question, such as a phrase or a sentence, the speaker's answer should address the topic of this question. In the case of an implicit formulation of a question, via a seed text of a message, an appropriate answer is expected not only maintain a topic, but also match the generalized epistemic state of this seed.

Rhetoric Relations

As discussed, aspects described herein use communicative discourse trees. Rhetorical relations can be described in different ways. For example, Mann and Thompson describe twenty-three possible relations. C. Mann, William & Thompson, Sandra. (1987) ("Mann and Thompson"). Rhetorical Structure Theory: A Theory of Text Organization. Other numbers of relations are possible.

| Relation Name | Nucleus | Satellite |
| --- | --- | --- |
| Antithesis | ideas favored by the author | the ideas disfavored by the author |
| Background | text whose understanding is being facilitated | text for facilitating understanding |
| Circumstance | text expressing the events or ideas occurring in interpretive context | an interpretive context of situation or the time |
| Concession | situation affirmed by author | situation which is apparently inconsistent but also affirmed by author |
| Condition | action or situation whose occurrence results from the occurrence of the conditioning situation | conditioning situation |
| Elaboration | basic information | additional information |
| Enablement | an action | information intended to aid the reader in performing an action |
| Evaluation | a situation | an evaluative comment about the situation |

-continued

| Relation Name | Nucleus | Satellite |
| --- | --- | --- |
| Evidence | a claim | information intended to increase the reader's belief in the claim |
| Interpretation | a situation | an interpretation of the situation |
| Justify | text | information supporting the writer's right to express the text |
| Motivation | an action | information intended to increase the reader's desire to perform the action |
| Non-volitional Cause | a situation | another situation which causes that one, but not by anyone's deliberate action |
| Non-volitional Result | a situation | another situation which is caused by that one, but not by anyone's deliberate action |
| Otherwise (anti-conditional) | action or situation whose occurrence results from the lack of occurrence of the conditioning situation | conditioning situation |
| Purpose | an intended situation | the intent behind the situation |
| Restatement | a situation | a reexpression of the situation |
| Solutionhood | a situation or method supporting full or partial satisfaction of the need | a question, request, problem, or other expressed need |
| Summary | text | a short summary of that text |
| Volitional Cause | a situation | another situation which causes that one, by someone's deliberate action |
| Volitional Result | a situation | another situation which is caused by that one, by someone's deliberate action |

Some empirical studies postulate that the majority of text is structured using nucleus-satellite relations. See Mann and Thompson. But other relations do not carry a definite selection of a nucleus. Examples of such relations are shown below.

| Relation Name | Span | Other Span |
| --- | --- | --- |
| Contrast | One alternate | The other alternate |
| Joint | (unconstrained) | (unconstrained) |
| List | An item | A next item |
| Sequence | An item | A next item |

Figure 2:
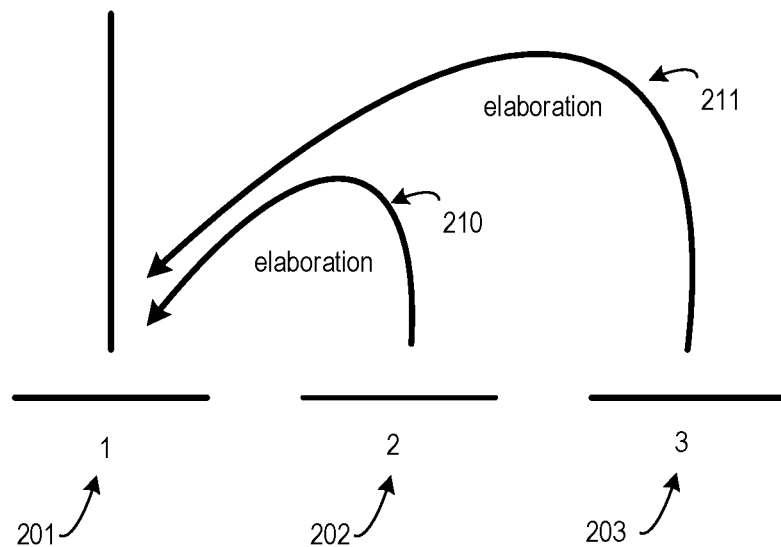
FIG. 2 depicts an example of a discourse tree in accordance with an aspect.

FIG. 2 depicts an example of a discourse tree, in accordance with an aspect. FIG. 2 includes discourse tree 200. Discourse tree includes text span 201, text span 202, text span 203, relation 210 and relation 228. The numbers in FIG. 2 correspond to the three text spans. FIG. 3 corresponds to the following example text with three text spans numbered 1, 2, 3:

1. Honolulu, Hi. will be site of the 2017 Conference on Hawaiian History

2. It is expected that 200 historians from the U.S. and Asia will attend

3. The conference will be concerned with how the Polynesians sailed to Hawaii

For example, relation 210, or elaboration, describes the relationship between text span 201 and text span 202. Relation 228 depicts the relationship, elaboration, between text span 203 and 204. As depicted, text spans 202 and 203 elaborate further on text span 201. In the above example, given a goal of notifying readers of a conference, text span 1 is the nucleus. Text spans 2 and 3 provide more detail about the conference. In FIG. 2, a horizontal number, e.g., 1-3, 1, 2, 3 covers a span of text (possibly made up of further spans); a vertical line signals the nucleus or nuclei; and a curve represents a rhetoric relation (elaboration) and the direction of the arrow points from the satellite to the nucleus. If the text span only functions as a satellite and not as a nuclei, then deleting the satellite would still leave a coherent text. If from FIG. 2 one deletes the nucleus, then text spans 2 and 3 are difficult to understand.

FIG. 3 depicts a further example of a discourse tree in accordance with an aspect. FIG. 3 includes components 301 and 302, text spans 305-307, relation 310 and relation 328. Relation 310 depicts the relationship 310, enablement, between components 306 and 305, and 307, and 305. FIG. 3 refers to the following text spans:

1. The new Tech Report abstracts are now in the journal area of the library near the abridged dictionary.
2. Please sign your name by any means that you would be interested in seeing.
3. Last day for sign-ups is 31 May.

As can be seen, relation 328 depicts the relationship between entity 307 and 306, which is enablement. FIG. 3 illustrates that while nuclei can be nested, there exists only one most nuclear text span.

Constructing a Discourse Tree

Discourse trees can be generated using different methods. A simple example of a method to construct a DT bottom up is:

(1) Divide the discourse text into units by:
 (a) Unit size may vary, depending on the goals of the analysis
 (b) Typically, units are clauses
(2) Examine each unit, and its neighbors. Is there a relation holding between them?
(3) If yes, then mark that relation.
(4) If not, the unit might be at the boundary of a higher-level relation. Look at relations holding between larger units (spans).
(5) Continue until all the units in the text are accounted for.

Figure 4:
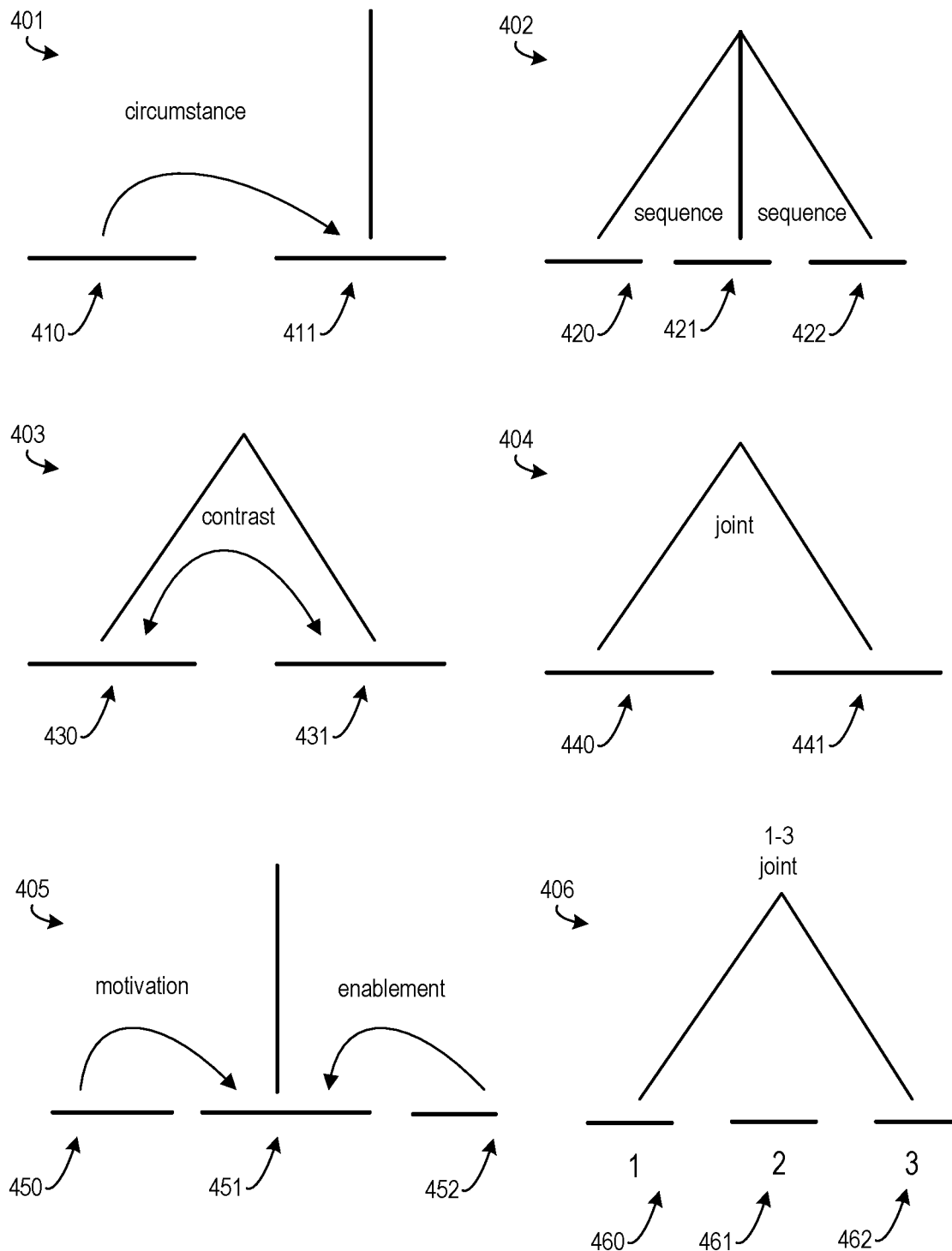
FIG. 4 depicts illustrative schemas, in accordance with an aspect.

Mann and Thompson also describe the second level of building block structures called schemas applications. In RST, rhetoric relations are not mapped directly onto texts; they are fitted onto structures called schema applications, and these in turn are fitted to text. Schema applications are derived from simpler structures called schemas (as shown by FIG. 4). Each schema indicates how a particular unit of text is decomposed into other smaller text units. A rhetorical structure tree or DT is a hierarchical system of schema applications. A schema application links a number of consecutive text spans, and creates a complex text span, which can in turn be linked by a higher-level schema application. RST asserts that the structure of every coherent discourse can be described by a single rhetorical structure tree, whose top schema creates a span encompassing the whole discourse.

FIG. 4 depicts illustrative schemas, in accordance with an aspect. FIG. 4 shows a joint schema is a list of items consisting of nuclei with no satellites. FIG. 4 depicts schemas 401-406. Schema 401 depicts a circumstance relation between text spans 410 and 428. Scheme 402 depicts a sequence relation between text spans 420 and 421 and a sequence relation between text spans 421 and 422. Schema 403 depicts a contrast relation between text spans 430 and 431. Schema 404 depicts a joint relationship between text spans 440 and 441. Schema 405 depicts a motivation relationship between 450 and 451, and an enablement relationship between 452 and 451. Schema 406 depicts joint relationship between text spans 460 and 462. An example of a joint scheme is shown in FIG. 4 for the three text spans below:

1. Skies will be partly sunny in the New York metropolitan area today.
2. It will be more humid, with temperatures in the middle 80's.
3. Tonight will be mostly cloudy, with the low temperature between 65 and 70.

While FIGS. 2-4 depict some graphical representations of a discourse tree, other representations are possible.

Figure 5:
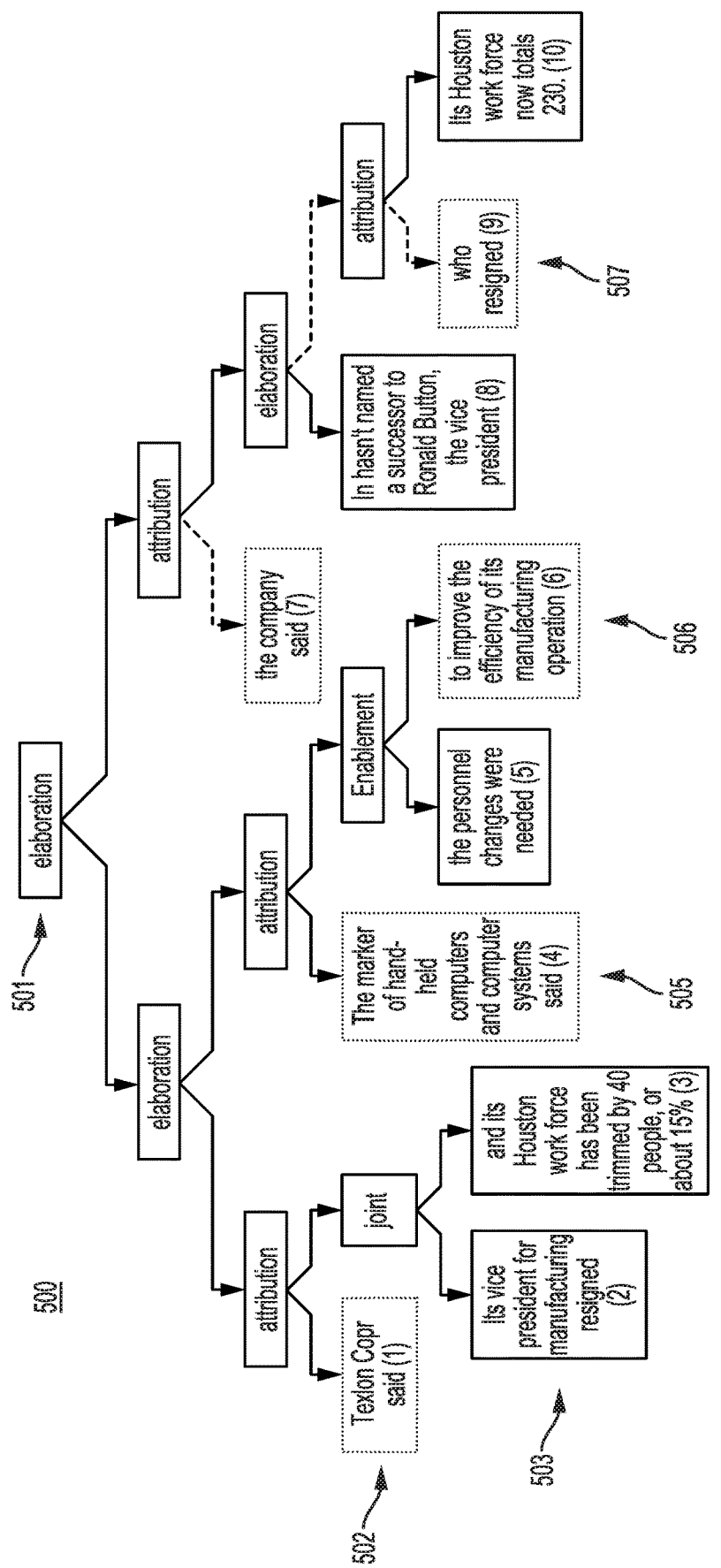
FIG. 5 depicts a node-link representation of the hierarchical binary tree in accordance with an aspect.

FIG. 5 depicts a node-link representation of the hierarchical binary tree in accordance with an aspect. As can be seen from FIG. 5, the leaves of a DT correspond to contiguous non-overlapping text spans called Elementary Discourse Units (EDUs). Adjacent EDUs are connected by relations (e.g., elaboration, attribution . . . ) and form larger discourse units, which are also connected by relations. "Discourse analysis in RST involves two sub-tasks: discourse segmentation is the task of identifying the EDUs, and discourse parsing is the task of linking the discourse units into a labeled tree." See Joty, Shafiq R and Giuseppe Carenini, Raymond T Ng, and Yashar Mehdad. 2013. Combining intra- and multi-sentential rhetorical parsing for document-level discourse analysis. In ACL (1), pages 486-496.

FIG. 5 depicts text spans that are leaves, or terminal nodes, on the tree, each numbered in the order they appear in the full text, shown in FIG. 6. FIG. 5 includes tree 500. Tree 500 includes, for example, nodes 501-507. The nodes indicate relationships. Nodes are non-terminal, such as node 501, or terminal, such as nodes 502-507. As can be seen, nodes 503 and 504 are related by a joint relationship. Nodes 502, 505, 506, and 508 are nuclei. The dotted lines indicate that the branch or text span is a satellite. The relations are nodes in gray boxes.

FIG. 6 depicts an exemplary indented text encoding of the representation in FIG. 5 in accordance with an aspect. FIG. 6 includes text 600 and text sequences 602-604. Text 600 is presented in a manner more amenable to computer programming. Text sequence 602 corresponds to node 502, sequence 603 corresponds to node 503, and sequence 604 corresponds to node 504. In FIG. 6, "N" indicates a nucleus and "S" indicates a satellite.

Examples of Discourse Parsers

Automatic discourse segmentation can be performed with different methods. For example, given a sentence, a segmentation model identifies the boundaries of the composite elementary discourse units by predicting whether a boundary should be inserted before each particular token in the sentence. For example, one framework considers each token in the sentence sequentially and independently. In this framework, the segmentation model scans the sentence token by token, and uses a binary classifier, such as a support vector machine or logistic regression, to predict whether it is appropriate to insert a boundary before the token being examined. In another example, the task is a sequential labeling problem. Once text is segmented into elementary discourse units, sentence-level discourse parsing can be performed to construct the discourse tree. Machine learning techniques can be used.

In one aspect of the present invention, two Rhetorical Structure Theory (RST) discourse parsers are used: CoreNLPProcessor which relies on constituent syntax, and FastNLPProcessor which uses dependency syntax. See Surdeanu, Mihai & Hicks, Thomas & Antonio Valenzuela-Escarcega, Marco. Two Practical Rhetorical Structure Theory Parsers. (2015).

In addition, the above two discourse parsers, i.e., CoreN-LPProcessor and FastNLPProcessor use Natural Language Processing (NLP) for syntactic parsing. For example, the Stanford CoreNLP gives the base forms of words, their parts of speech, whether they are names of companies, people, etc., normalize dates, times, and numeric quantities, mark up the structure of sentences in terms of phrases and syntactic dependencies, indicate which noun phrases refer to the same entities. Practically, RST is a still theory that may work in many cases of discourse, but in some cases, it may not work. There are many variables including, but not limited to, what EDU's are in a coherent text, i.e., what discourse segmenters are used, what relations inventory is used and what relations are selected for the EDUs, the corpus of documents used for training and testing, and even what parsers are used. So for example, in Surdeanu, et al., "Two Practical Rhetorical Structure Theory Parsers," paper cited above, tests must be run on a particular corpus using specialized metrics to determine which parser gives better performance. Thus unlike computer language parsers which give predictable results, discourse parsers (and segmenters) can give unpredictable results depending on the training and/or test text corpus. Thus, discourse trees are a mixture of the predicable arts (e.g., compilers) and the unpredictable arts (e.g., like chemistry were experimentation is needed to determine what combinations will give you the desired results).

In order to objectively determine how good a Discourse analysis is, a series of metrics are being used, e.g., Precision/Recall/F1 metrics from Daniel Marcu, "The Theory and Practice of Discourse Parsing and Summarization," MIT Press, (2000). Precision, or positive predictive value is the fraction of relevant instances among the retrieved instances, while recall (also known as sensitivity) is the fraction of relevant instances that have been retrieved over the total amount of relevant instances. Both precision and recall are therefore based on an understanding and measure of relevance. Suppose a computer program for recognizing dogs in photographs identifies eight dogs in a picture containing 12 dogs and some cats. Of the eight dogs identified, five actually are dogs (true positives), while the rest are cats (false positives). The program's precision is 5/8 while its recall is 5/12. When a search engine returns 30 pages only 20 of which were relevant while failing to return 40 additional relevant pages, its precision is 20/30=2/3 while its recall is 20/60=1/3. Therefore, in this case, precision is 'how useful the search results are', and recall is 'how complete the results are.'" The F1 score (also F-score or F-measure) is a measure of a test's accuracy. It considers both the precision and the recall of the test to compute the score: F1=2× ((precision×recall)/(precision+recall)) and is the harmonic mean of precision and recall. The F1 score reaches its best value at 1 (perfect precision and recall) and worst at 0.

Analyzing Sentence Pairs

Figure 7:
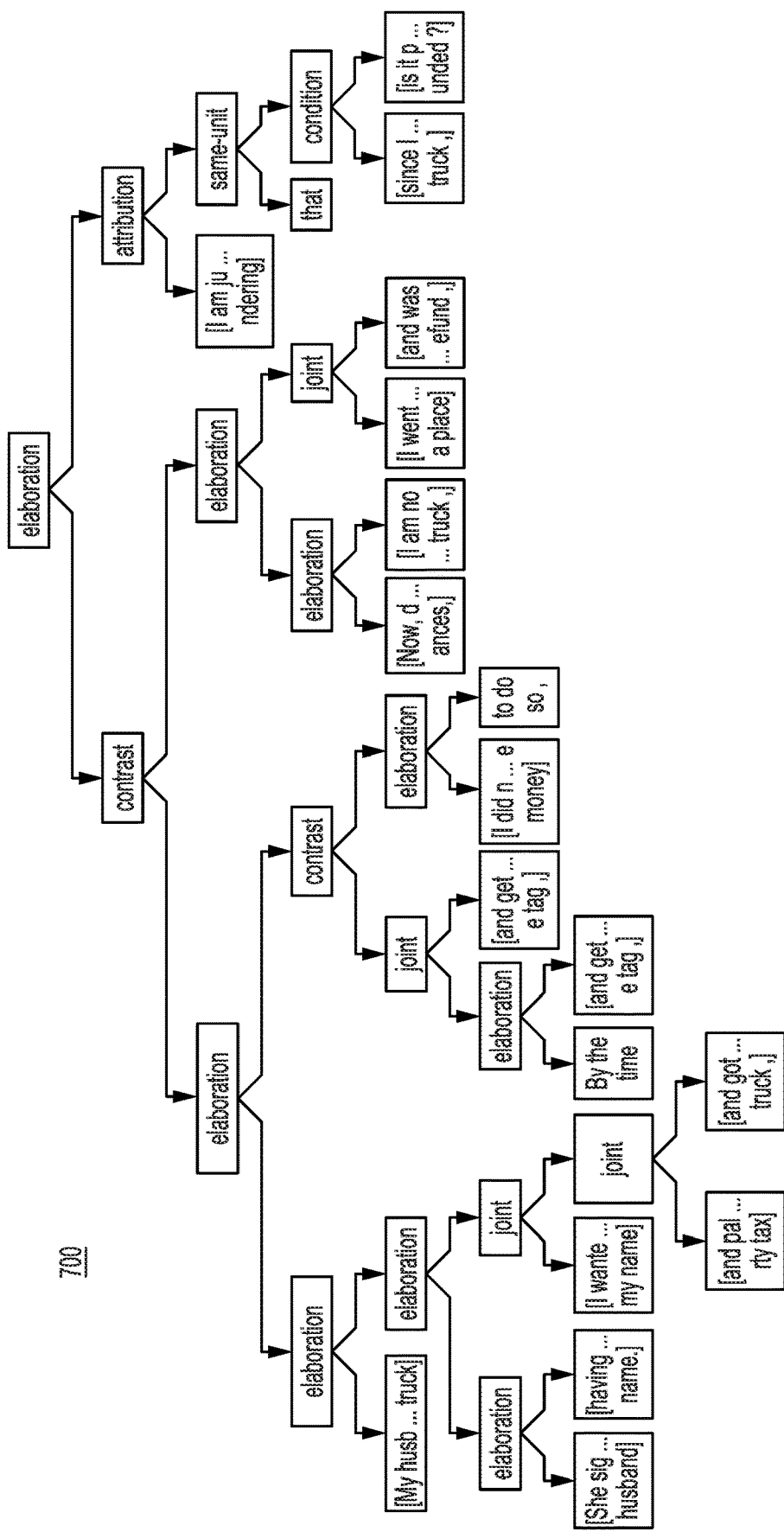
FIG. 7 depicts an exemplary DT for an example request about property tax in accordance with an aspect.

As described, aspects described herein can be used to determine whether a document is public or private. In a similar fashion, aspects described herein can also be used to analyze request and response pairs such as a question and an answer, to determine whether the answer addresses the question. Examples of the request and response case are provided herein for illustrative purposes. FIG. 7 depicts an exemplary DT for an example request about property tax in accordance with an aspect. The node labels are the relations and the arrowed line points to the satellite. The nucleus is a solid line. FIG. 7 depicts the following text.

Request: "My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so. Now, due to circumstances, I am not going to be able to afford the truck. I went to the insurance place and was refused a refund. I am just wondering that since I am not going to have a tag on this truck, is it possible to get the property tax refunded?"

Response: "The property tax is assessed on property that you own. Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax. If you apply late, there will be penalties on top of the normal taxes and fees. You don't need to register it at the same time, but you absolutely need to title it within the period of time stipulated in state law."

As can be seen in FIG. 7, analyzing the above text results in the following. "My husbands' grandmother gave him his grandfather's truck" is elaborated by "She signed the title over but due to my husband" elaborated by "having unpaid fines on his license, he was not able to get the truck put in his name." which is elaborated by "I wanted to put in my name," "and paid the property tax", and "and got insurance for the truck."

"My husbands' grandmother gave him his grandfather's truck. She signed the title over but due to my husband having unpaid fines on his license, he was not able to get the truck put in his name. I wanted to put in my name and paid the property tax and got insurance for the truck." is elaborated by;

"I didn't have the money" elaborated by "to do so" contrasted with "By the time" elaborated by "it came to sending off the title"

"and getting the tag"

"My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so" is contrasted with "Now, due to circumstances," elaborated with "I am not going to be able to afford the truck." which is elaborated with "I went to the insurance place"

"and was refused a refund"

"My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so. Now, due to circumstances, I am not going to be able to afford the truck. I went to the insurance place and was refused a refund." is elaborated with "I am just wondering that since I am not going to have a tag on this truck, is it possible to get the property tax refunded?"

"I am just wondering" has attribution to

"that" is the same unit as "is it possible to get the property tax refunded?" which has condition "since I am not going to have a tag on this truck"

As can be seen, the main subject of the topic is "Property tax on a car". The question includes the contradiction: on one hand, all properties are taxable, and on the other hand, the ownership is somewhat incomplete. A good response has to address both topic of the question and clarify the inconsistency. To do that, the responder is making even stronger claim concerning the necessity to pay tax on whatever is owned irrespectively of the registration status. This example is a member of positive training set from our Yahoo! Answers evaluation domain. The main subject of the topic is "Property tax on a car". The question includes the contradiction: on one hand, all properties are taxable, and on the other hand, the ownership is somewhat incomplete. A good answer/response has to address both topic of the question and clarify the inconsistency. The reader can observe that since the question includes rhetoric relation of contrast, the answer has to match it with a similar relation to be convincing. Otherwise, this answer would look incomplete even to those who are not domain experts.

Figure 8:
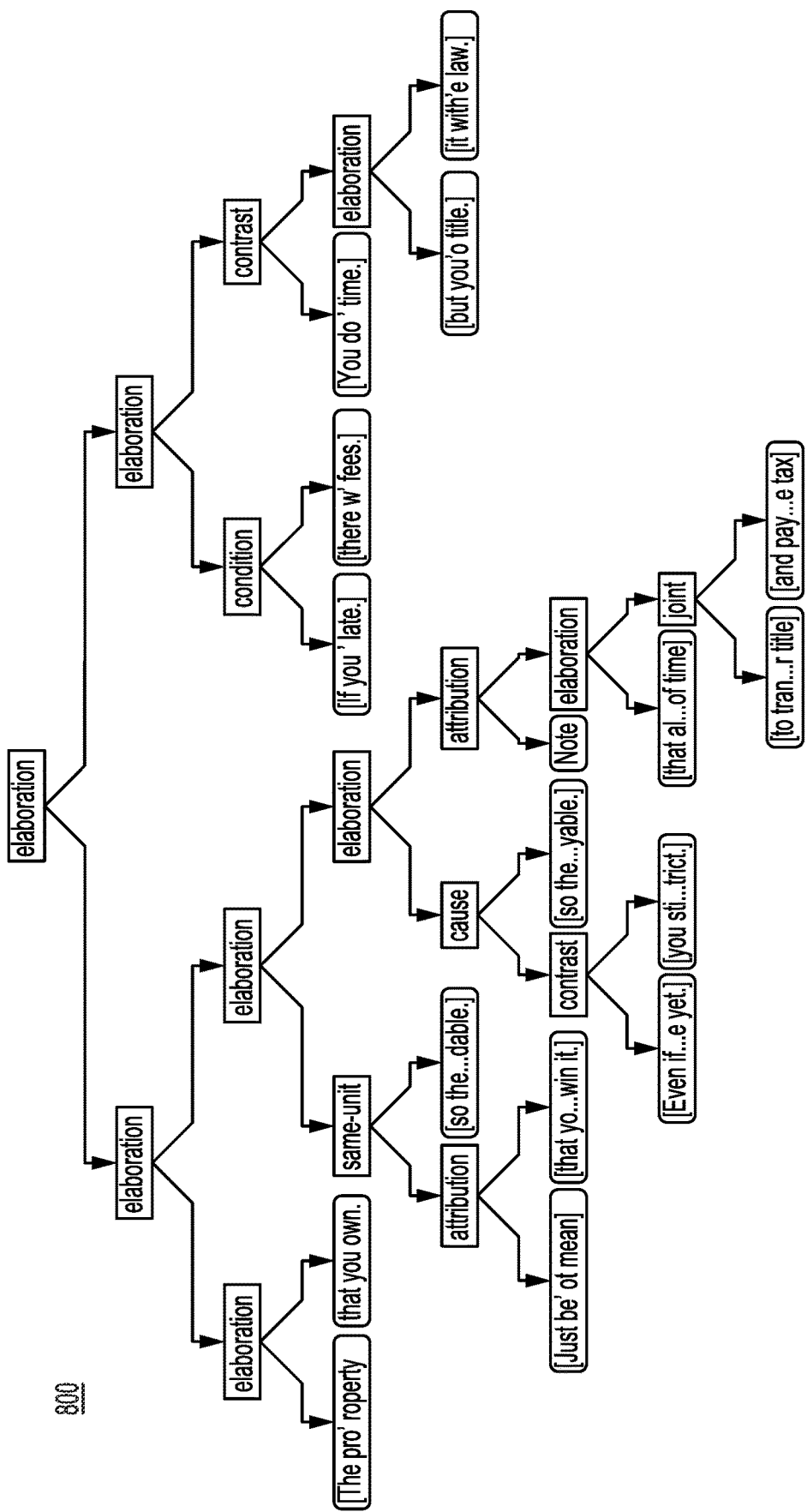
FIG. 8 depicts an exemplary response for the question represented in FIG. 7.

FIG. 8 depicts an exemplary response for the question represented in FIG. 7, according to certain aspects of the present invention. The central nucleus is "the property tax is assessed on property" elaborated by "that you own". "The property tax is assessed on property that you own" is also a nucleus elaborated by "Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax."

The nucleus "The property tax is assessed on property that you own. Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax." is elaborated by "there will be penalties on top of the normal taxes and fees" with condition "If you apply late," which in turn is elaborated by the contrast of "but you absolutely need to title it within the period of time stipulated in state law." and "You don't need to register it at the same time.".

Comparing the DT of FIG. 7 and DT of FIG. 8, enables a determination of how well matched the response (FIG. 8) is to the request (FIG. 7). In some aspects of the present invention, the above framework is used, at least in part, to determine the DTs for the request/response and the rhetoric agreement between the DTs.

In another example, the question "What does The Investigative Committee of the Russian Federation do" has at least two answers, for example, an official answer or an actual answer.

Figure 9:
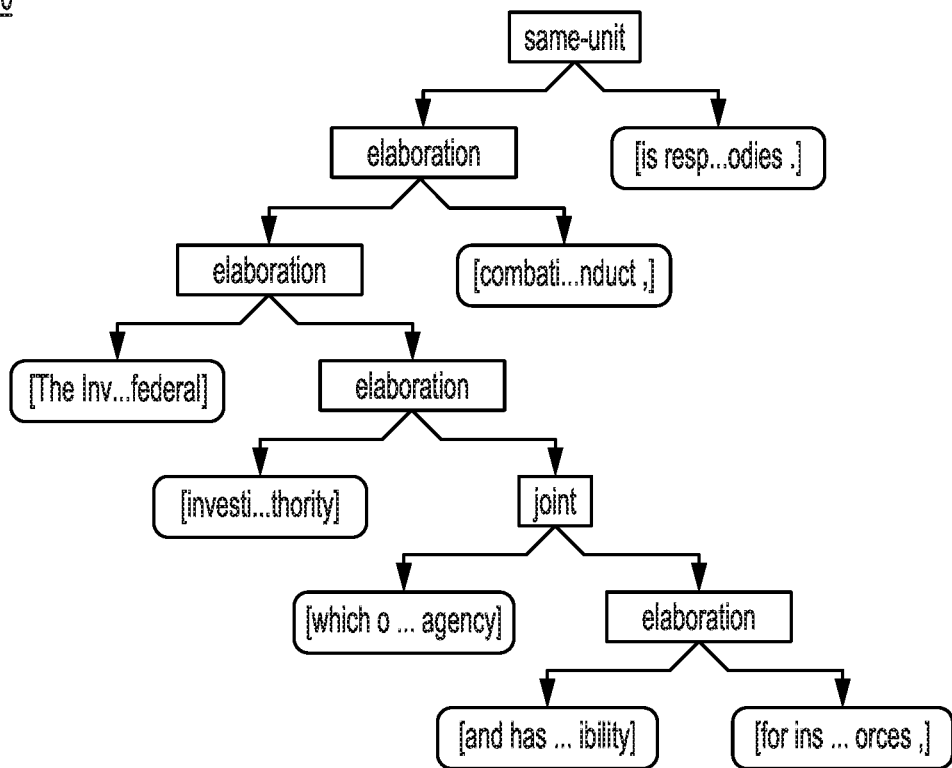
FIG. 9 illustrates a discourse tree for an official answer in accordance with an aspect.

FIG. 9 illustrates a discourse tree for an official answer in accordance with an aspect. As depicted in FIG. 9, an official answer, or mission statement states that "The Investigative Committee of the Russian Federation is the main federal investigating authority which operates as Russia's Anti-corruption agency and has statutory responsibility for inspecting the police forces, combating police corruption and police misconduct, is responsible for conducting investigations into local authorities and federal governmental bodies."

Figure 10:
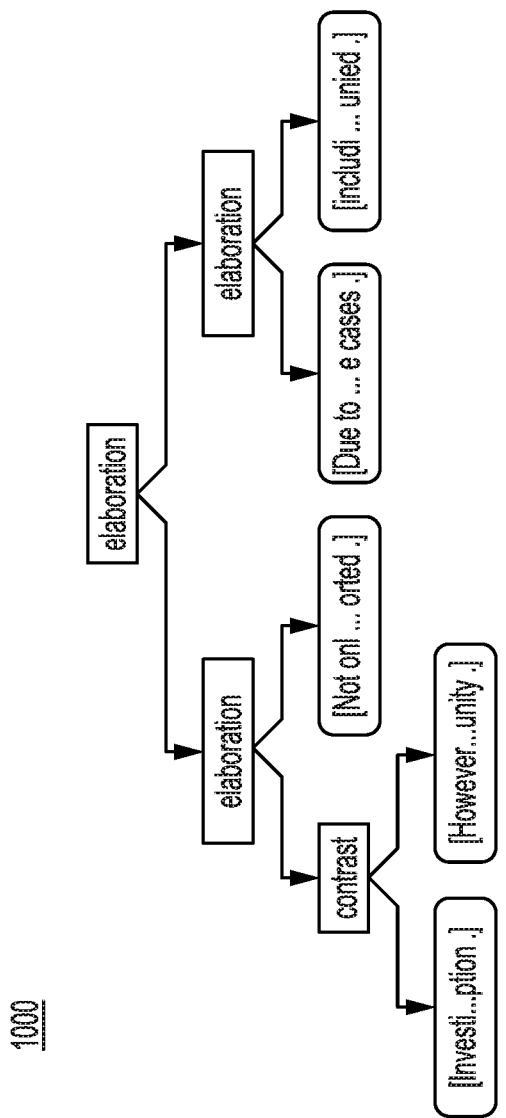
FIG. 10 illustrates a discourse tree for a raw answer in accordance with an aspect.

FIG. 10 illustrates a discourse tree for a raw answer in accordance with an aspect. As depicted in FIG. 10, another, perhaps more honest, answer states that "Investigative Committee of the Russian Federation is supposed to fight corruption. However, top-rank officers of the Investigative Committee of the Russian Federation are charged with creation of a criminal community. Not only that, but their involvement in large bribes, money laundering, obstruction of justice, abuse of power, extortion, and racketeering has been reported. Due to the activities of these officers, dozens of high-profile cases including the ones against criminal lords had been ultimately ruined."

The choice of answers depends on context. Rhetoric structure allows differentiating between "official", "politically correct", template-based answers and "actual", "raw", "reports from the field", or "controversial" answers, see FIG. 9 and FIG. 10). Sometimes, the question itself can give a hint about which category of answers is expected. If a question is formulated as a factoid or definitional one, without a second meaning, then the first category of answers is suitable. Otherwise, if a question has the meaning "tell me what it really is", then the second category is appropriate. In general, after extracting a rhetoric structure from a question, selecting a suitable answer that would have a similar, matching, or complementary rhetoric structure is easier.

The official answer is based on elaboration and joints, which are neutral in terms of controversy a text might contain (See FIG. 9). At the same time, the row answer includes the contrast relation. This relation is extracted between the phrase for what an agent is expected to do and what this agent was discovered to have done.

Communicative Discourse Trees (CDTs)

Aspects of the present disclosure build communicative discourse trees and use communicative discourse trees to analyze the rhetorical structure of documents. More specifically, aspects described herein create representations of sentences or utterances and use trained machine learning models to determine an intent from a set of intent classes.

To represent linguistic features of text, aspects described herein use rhetoric relations and speech acts (or communicative actions). Rhetoric relations are relationships between the parts of the sentences, typically obtained from a discourse tree. Speech acts are obtained as verbs from a verb resource such as VerbNet. By using both rhetoric relations and communicative actions, aspects described herein can correctly recognize sentences that indicate whether a document is public or private.

Intent classification application 102 can create, analyze, and compare communicative discourse trees. Communicative discourse trees are designed to combine rhetoric information with speech act structures. CDTs include with arcs labeled with expressions for communicative actions. By combining communicative actions, CDTs enable the modeling of RST relations and communicative actions. A CDT is a reduction of a parse thicket. See Galitsky, B, Ilvovsky, D. and Kuznetsov S O. Rhetoric Map of an Answer to Compound Queries Knowledge Trail Inc. ACL 2015, 681-686. ("Galitsky 2015"). By incorporating labels that identify speech actions, learning of communicative discourse trees can occur over a richer features set than just rhetoric relations and syntax of elementary discourse units (EDUs).

In an example, a dispute between three parties concerning the causes of a downing of a commercial airliner, Malaysia Airlines Flight 17 is analyzed. An RST representation of the arguments being communicated is built. In the example, three conflicting agents, Dutch investigators, The Investigative Committee of the Russian Federation, and the self-proclaimed Donetsk People's Republic exchange their opinions on the matter. The example illustrates a controversial conflict where each party does all it can to blame its opponent. To sound more convincing, each party does not just produce its claim but formulates a response in a way to rebuff the claims of an opponent. To achieve this goal, each party attempts to match the style and discourse of the opponents' claims.

Figure 11:
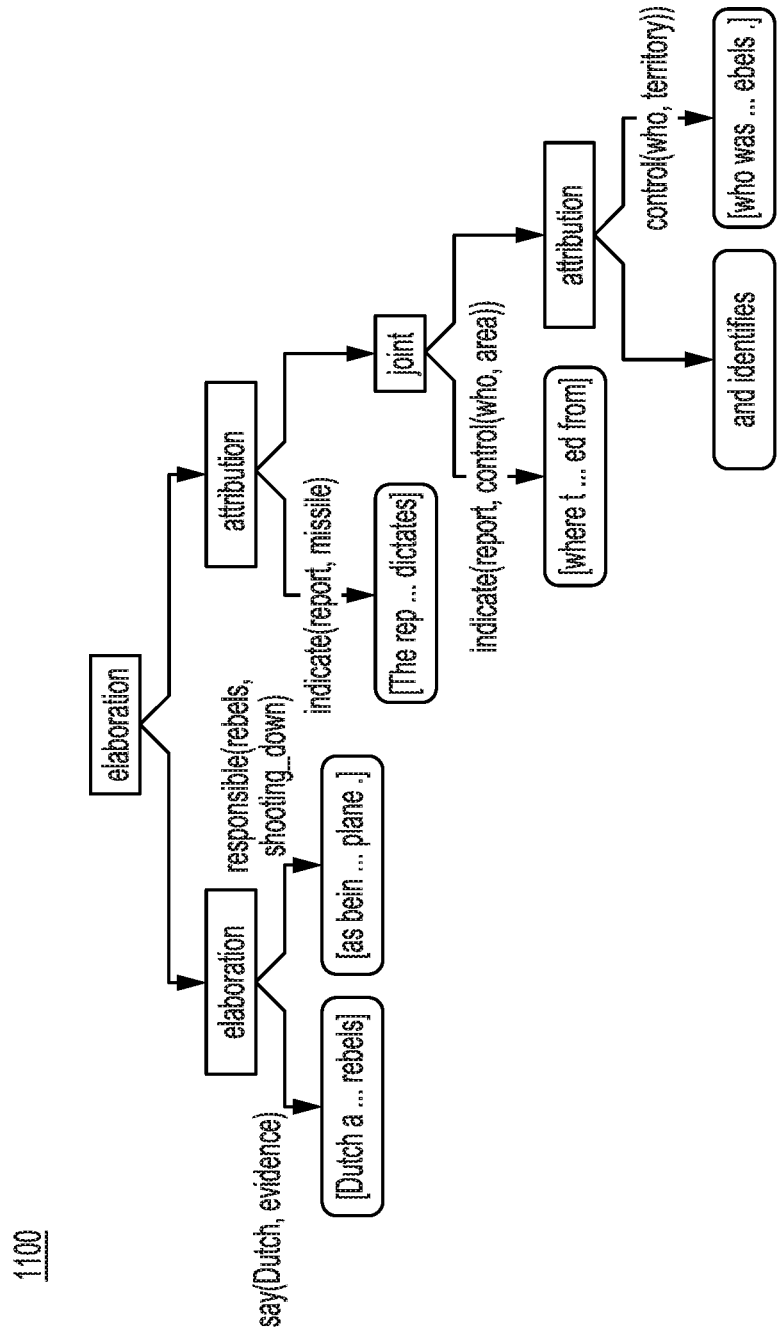
FIG. 11 illustrates a communicative discourse tree for a claim of a first agent in accordance with an aspect.

FIG. 11 illustrates a communicative discourse tree for a claim of a first agent in accordance with an aspect. FIG. 11 depicts communicative discourse tree 100, which represents the following text: "Dutch accident investigators say that evidence points to pro-Russian rebels as being responsible for shooting down plane. The report indicates where the missile was fired from and identifies who was in control of the territory and pins the downing of MH17 on the pro-Russian rebels."

As can be seen from FIG. 11, non-terminal nodes of CDTs are rhetoric relations, and terminal nodes are elementary discourse units (phrases, sentence fragments) which are the subjects of these relations. Certain arcs of CDTs are labeled with the expressions for communicative actions, including the actor agent and the subject of these actions (what is being communicated). For example, the nucleus node for elaboration relation (on the left) are labeled with say (Dutch, evidence), and the satellite with responsible (rebels, shooting down). These labels are not intended to express that the subjects of EDUs are evidence and shooting down but instead for matching this CDT with others for the purpose of finding similarity between them. In this case just linking these communicative actions by a rhetoric relation and not providing information of communicative discourse would be too limited way to represent a structure of what and how is being communicated. A requirement for an RR pair to have the same or coordinated rhetoric relation is too weak, so an agreement of CDT labels for arcs on top of matching nodes is required.

The straight edges of this graph are syntactic relations, and curvy arcs are discourse relations, such as anaphora, same entity, sub-entity, rhetoric relation and communicative actions. This graph includes much richer information than just a combination of parse trees for individual sentences. In addition to CDTs, parse thickets can be generalized at the level of words, relations, phrases and sentences. The speech actions are logic predicates expressing the agents involved in the respective speech acts and their subjects. The arguments of logical predicates are formed in accordance to respective semantic roles, as proposed by a framework such as VerbNet. See Karin Kipper, Anna Korhonen, Neville Ryant, Martha Palmer, A Large-scale Classification of English Verbs, Language Resources and Evaluation Journal, 42(1), pp. 21-40, Springer Netherland, 2008. and/or Karin Kipper Schuler, Anna Korhonen, Susan W. Brown, VerbNet overview, extensions, mappings and apps, Tutorial, NAACL-HLT 2009, Boulder, Colo.

Figure 12:
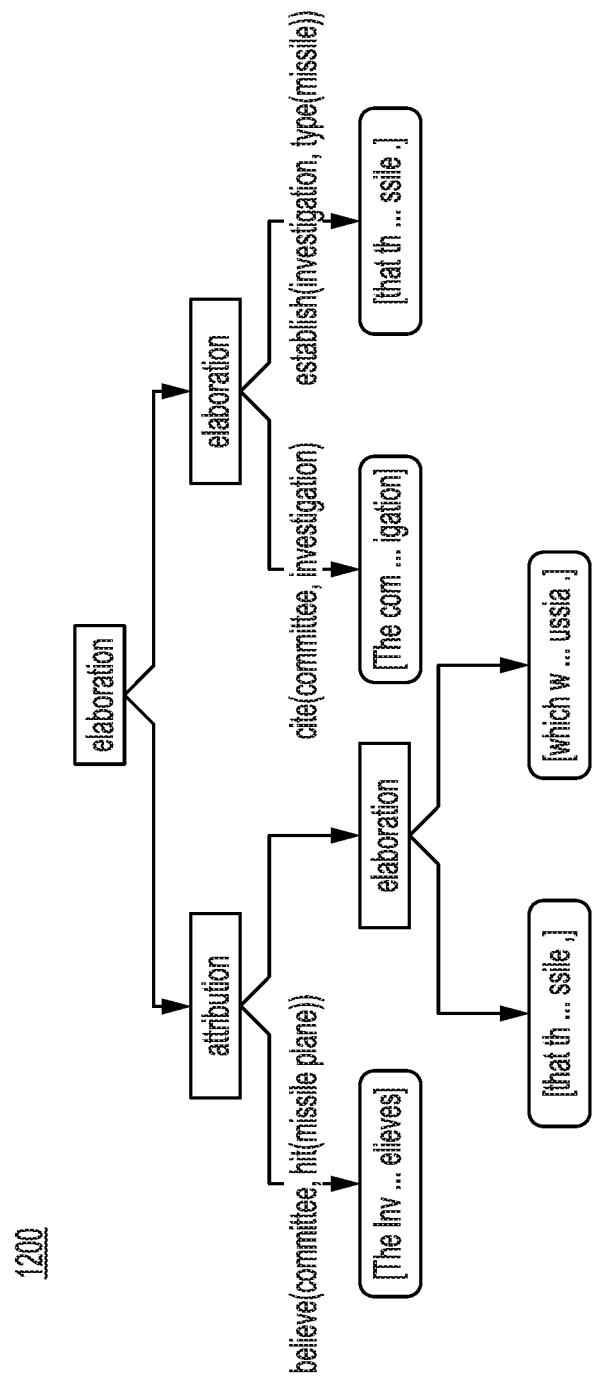
FIG. 12 illustrates a communicative discourse tree for a claim of a second agent in accordance with an aspect.

FIG. 12 illustrates a communicative discourse tree for a claim of a second agent in accordance with an aspect. FIG. 12 depicts communicative discourse tree 1200, which represents the following text: "The Investigative Committee of the Russian Federation believes that the plane was hit by a missile, which was not produced in Russia. The committee cites an investigation that established the type of the missile."

Figure 13:
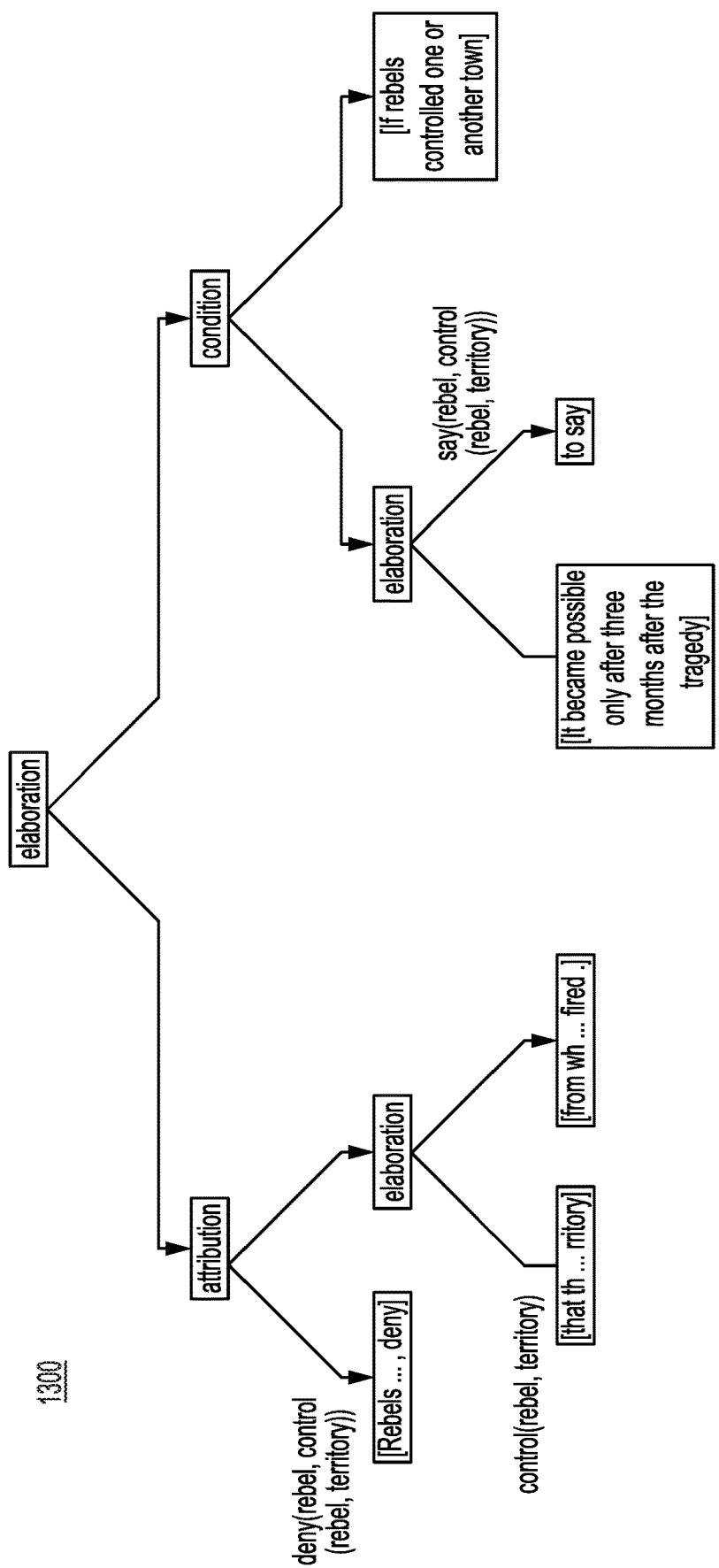
FIG. 13 illustrates a communicative discourse tree for a claim of a third agent in accordance with an aspect.

FIG. 13 illustrates a communicative discourse tree for a claim of a third agent in accordance with an aspect. FIG. 13 depicts communicative discourse tree 1300, which represents the following text: "Rebels, the self-proclaimed Donetsk People's Republic, deny that they controlled the territory from which the missile was allegedly fired. It became possible only after three months after the tragedy to say if rebels controlled one or another town."

As can be seen from communicative discourse trees 1100-1300, a response is not arbitrary. A response talks about the same entities as the original text. For example, communicative discourse trees 1200 and 1300 are related to communicative discourse tree 1100. A response backs up a disagreement with estimates and sentiments about these entities, and about actions of these entities.

More specifically, replies of involved agent need to reflect the communicative discourse of the first, seed message. As a simple observation, because the first agent uses Attribution to communicate his claims, the other agents have to follow the suite and either provide their own attributions or attack the validity of attribution of the proponent, or both. To capture a broad variety of features for how communicative structure of the seed message needs to be retained in consecutive messages, pairs of respective CDTs can be learned.

To verify the agreement of a request-response, discourse relations or speech acts (communicative actions) alone are often insufficient. As can be seen from the example depicted in FIGS. 11-13, the discourse structure of interactions between agents and the kind of interactions are useful. However, the domain of interaction (e.g., military conflicts or politics) or the subjects of these interactions, i.e., the entities, do not need to be analyzed.

Representing Rhetoric Relations and Communicative Actions

In order to compute similarity between abstract structures, two approaches are frequently used: (1) representing these structures in a numerical space, and express similarity as a number, which is a statistical learning approach, or (2) using a structural representation, without numerical space, such as trees and graphs, and expressing similarity as a maximal common sub-structure. Expressing similarity as a maximal common sub-structure is referred to as generalization.

Learning communicative actions helps express and understand arguments. Computational verb lexicons help support acquisition of entities for actions and provide a rule-based form to express their meanings. Verbs express the semantics of an event being described as well as the relational information among participants in that event, and project the syntactic structures that encode that information. Verbs, and in particular communicative action verbs, can be highly variable and can display a rich range of semantic behaviors. In response, verb classification helps a learning systems to deal with this complexity by organizing verbs into groups that share core semantic properties.

VerbNet is one such lexicon, which identifies semantic roles and syntactic patterns characteristic of the verbs in each class and makes explicit the connections between the syntactic patterns and the underlying semantic relations that can be inferred for all members of the class. See Karin Kipper, Anna Korhonen, Neville Ryant and Martha Palmer, *Language Resources and Evaluation*, Vol. 42, No. 1 (March 2008), at 21. Each syntactic frame, or verb signature, for a class has a corresponding semantic representation that details the semantic relations between event participants across the course of the event.

For example, the verb amuse is part of a cluster of similar verbs that have a similar structure of arguments (semantic roles) such as amaze, anger, arouse, disturb, and irritate. The roles of the arguments of these communicative actions are as follows: Experiencer (usually, an animate entity), Stimulus, and Result. Each verb can have classes of meanings differentiated by syntactic features for how this verb occurs in a sentence, or frames. For example, the frames for amuse are as follows, using the following key noun phrase (NP), noun (N), communicative action (V), verb phrase (VP), adverb (ADV):

NP V NP. Example: "The teacher amused the children." Syntax: Stimulus V Experiencer. Clause: amuse(Stimulus, E, Emotion, Experiencer), cause(Stimulus, E), emotional_state(result(E), Emotion, Experiencer).

NP V ADV-Middle. Example: "Small children amuse quickly." Syntax: Experiencer V ADV. Clause: amuse(Experiencer, Prop):-, property(Experiencer, Prop), adv(Prop).

NP V NP-PRO-ARB. Example "The teacher amused." Syntax Stimulus V. amuse(Stimulus, E, Emotion, Experiencer): cause(Stimulus, E), emotional_state(result(E), Emotion, Experiencer).

NP.cause V NP. Example "The teacher's dolls amused the children." syntax Stimulus <+genitive>('s) V Experiencer. amuse(Stimulus, E, Emotion, Experiencer): cause(Stimulus, E), emotional_state(during(E), Emotion, Experiencer).

NP V NP ADJ. Example "This performance bored me totally." syntax Stimulus V Experiencer Result. amuse(Stimulus, E, Emotion, Experiencer). cause(Stimulus, E), emotional_state(result(E), Emotion, Experiencer), Pred(result(E), Experiencer).

Communicative actions can be characterized into clusters, for example:
Verbs with Predicative Complements (Appoint, characterize, dub, declare, conjecture, masquerade, orphan, captain, consider, classify), Verbs of Perception (See, sight, peer).
Verbs of Psychological State (Amuse, admire, marvel, appeal), Verbs of Desire (Want, long).
Judgment Verbs (Judgment), Verbs of Assessment (Assess, estimate), Verbs of Searching (Hunt, search, stalk, investigate, rummage, ferret), Verbs of Social Interaction (Correspond, marry, meet, battle), Verbs of Communication (Transfer(message), inquire, interrogate, tell, manner(speaking), talk, chat, say, complain, advise, confess, lecture, overstate, promise). Avoid Verbs (Avoid), Measure Verbs, (Register, cost, fit, price, bill), Aspectual Verbs (Begin, complete, continue, stop, establish, sustain.

Determining Intent

Aspects described herein can be used in applications such as autonomous agents or chatbots. Chatbots are distributed as platforms for content providers to populate with question-answer pairs and sample utterances to train user intent recognition. But Chatbot platforms typically rely on training. As a result, an accuracy of such recognition engines cannot be controlled. In contrast, aspects described herein learn the syntactic and discourse structure of queries from an extensive dataset and do not require re-training or adjustment.

Aspects described herein determine an intent class of a document by creating a CDT by performing discourse analysis on selected sentences from a body of text and using the rhetorical relationship between multiple sentences in one or more machine learning model to determine the class of the text. Using rhetorical information that is distributed across multiple sentences increases the accuracy of the intent classification system. Tree kernel learning can be used. Tree kernel learning allows a tree such as a parse tree to be provided directly to a classification model without the need to generate a feature vector. Tree kernel learning allows the incorporation of language structure features in addition to keyword statistics (traditional features of language learning). Because classes of intent depend mostly on syntactic and rhetoric structures. Hence a tree kernel based learning significantly outperforms statistical learning such as SVM or deep learning since a richer set of highly correlated features can be leveraged.

As discussed, sentence or keyword-based representations are insufficient for learning intent. For example, important phrases can be distributed through different sentences. Parse trees are combined in order to capture the phrase of interest. Consider the following text: 'This document describes the design of back end processor. Its requirements are enumerated below.' Looking at the first sentence alone, the document might be identified as a design document. In order to process the second sentence, the preposition 'its' must be disambiguated. "Its' refers to "document." As a result, the intent classification application 102 concludes from the second sentence that the document is a requirements document rather than a design document.

Sentence structural information can indicate class. The idea of measuring similarity between the question-answer pairs for question answering instead of the question-answer similarity turned out to be fruitful. The classifier for correct vs incorrect answers processes two pairs at a time, $<q_1, a_1>$ and $<q_2, a_2>$, and compare $q_1$ with $q_2$ and $a_1$ with $a_2$, producing a combined similarity score. Such a comparison allows to determine whether an unknown question/answer pair contains a correct answer or not by assessing its distance from another question/answer pair with a known label. In particular, an unlabeled pair $<q_2, a_2>$ will be processed so that rather than "guessing" correctness based on words or structures shared by $q_2$ and $a_2$, both $q_2$ and $a_2$ will be compared to their correspondent components $q_1$ and $a_1$ of the labeled pair $<q_2, a_2>$ on the grounds of such words or structures. Because this approach targets a domain-independent classification of answer, only the structural cohesiveness between a question and answer is leveraged, not 'meanings' of answers.

Training data 125 can include positive training paragraphs that are "plausible" sequences of sentences for a class, and negative training paragraphs that are "implausible" sequences, irrespectively of the domain specific keywords in these sentences.

Figure 14:
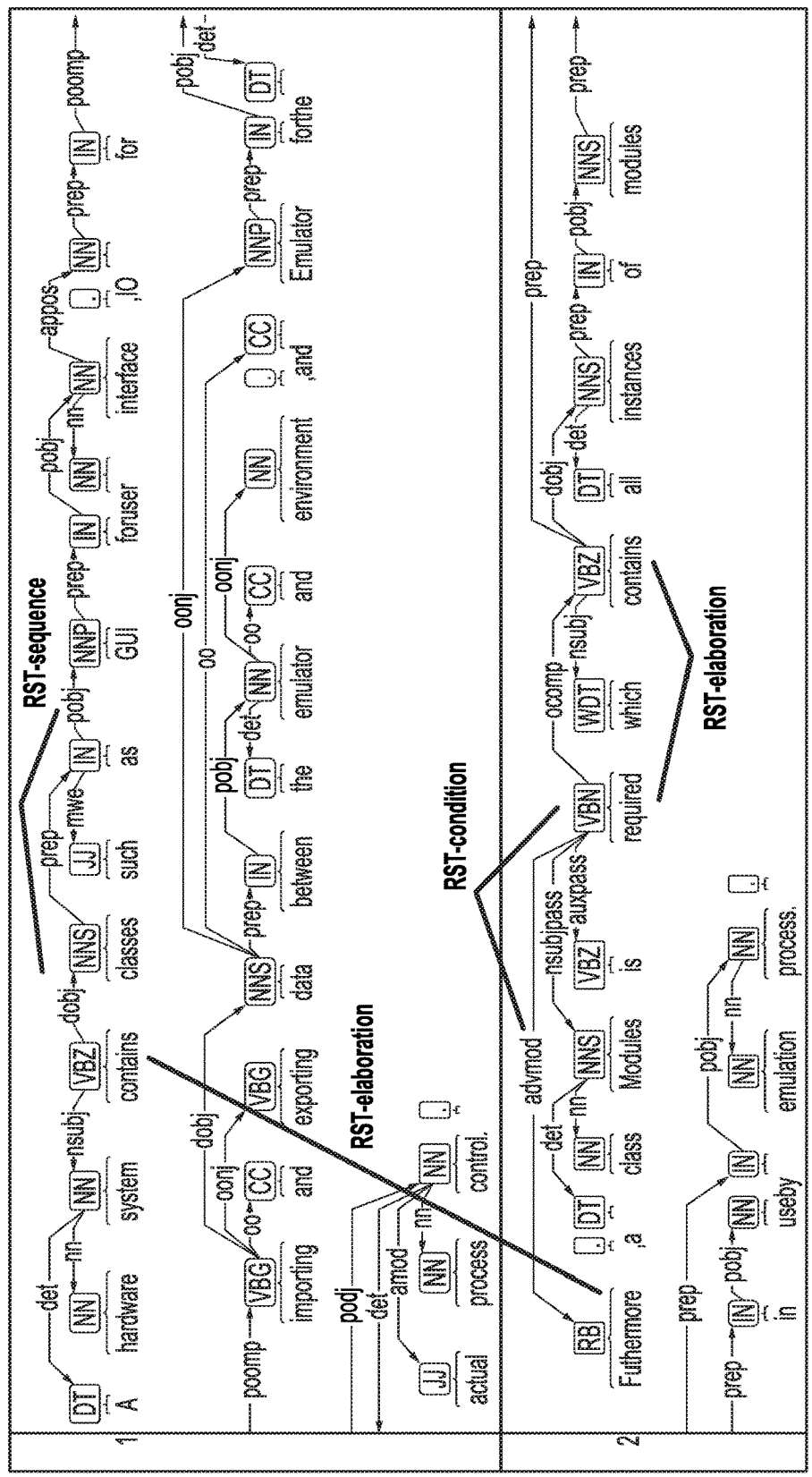
FIG. 14 depicts an exemplary sequence of parse trees and RST relations for a positive example, according to certain aspects of the present disclosure.

FIG. 14 depicts an exemplary sequence of parse trees and RST relations for a positive example, according to certain aspects of the present disclosure. FIG. 14 depicts parse tree sequence 1400 for sentence 1401 and sentence 1402. Sentence 1401 reads "A hardware system contains classes such as GUI for user interface, IO for importing and exporting data between the emulator and environment, and Emulator for the actual process control." Sentence 1402 reads "Furthermore, a class Modules is required which contains all instances of modules in use by emulation process." As can be seen, sentence 1402 is related to sentence 1401, hence this sequence is a positive sequence.

Figure 15:
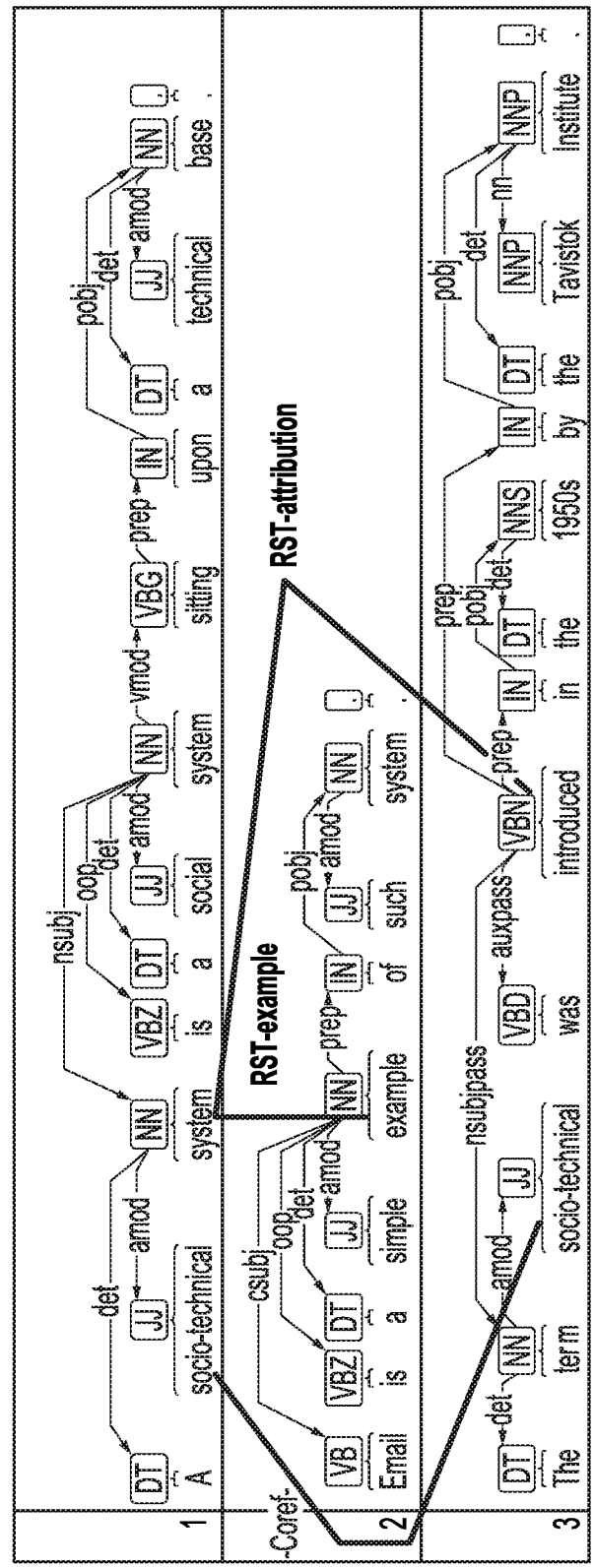
FIG. 15 depicts an exemplary sequence of parse trees and RST relations for a negative example, according to certain aspects of the present disclosure.

FIG. 15 depicts an exemplary sequence of parse trees and RST relations for a negative example, according to certain aspects of the present disclosure. FIG. 15 depicts parse tree sequence 1500 for sentence 1501, sentence 1502, and sentence 1503. Sentence 1501 reads "A socio-technical system is a social system sitting upon a technical base." Sentence 1501 reads "Email is a simple example of such system." Sentence 1503 reads "The term socio-technical was introduced in the 1950s by the Tavistok Institute.' As can be seen, the sequence of sentences 1501-1503 is labeled implausible, because sentence 1503 does not address sentence 1501.

Figure 16:
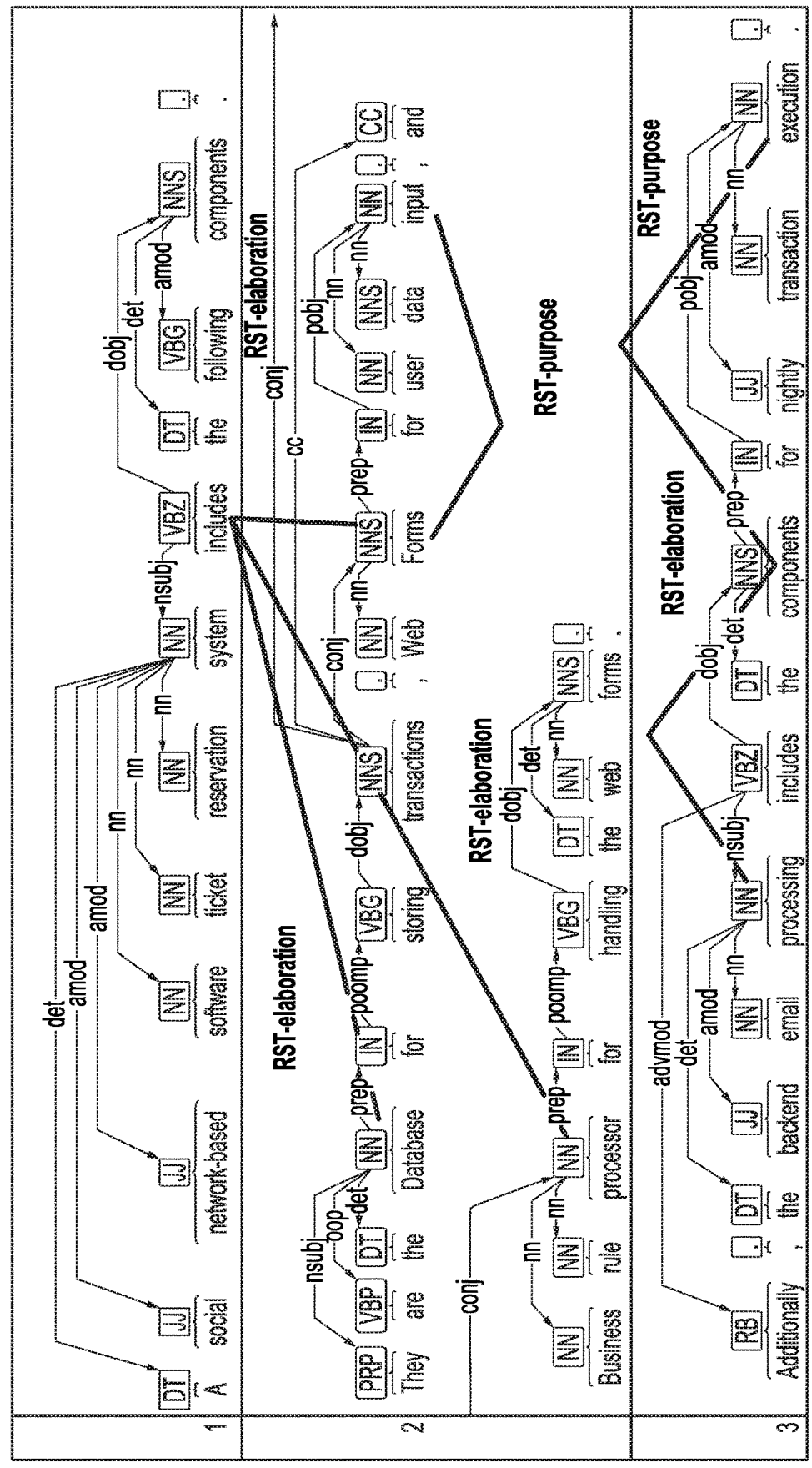
FIG. 16 depicts an exemplary sequence of parse trees and RST relations for text, according to certain aspects of the present disclosure.

FIG. 16 depicts an exemplary sequence of parse trees and RST relations for text, according to certain aspects of the present disclosure. 'A social network-based software ticket reservation system includes the following components. They are the Database for storing transactions, Web Forms for user data input, and Business rule processor for handling the web forms. Additionally, the backend email processing includes the components for nightly transaction execution.'

The above paragraph follows the rhetoric structure of the top (positive) training set element, although it shares more common keywords with the bottom (negative) element. Hence we classify it as a design document text, since it describes the system rather than introduces a terms (as the negative element does).

Similarly, another example follows. If $q_1$ is 'What is plutocracy?' and the candidate answers are $a_1$='Plutocracy may be defined as a state where . . . ' vs $a_0$='Plutocracy affects the wills of people . . . ', comparison with the correct pair formed by $q_2$='What is a source control software?' and $a_2$='A source control software can be defined as a . . . ' will induce the kernel method to prefer $a_1$ to $a_0$. One can see that $a_1$ has a similar wording and structure to $a_2$, hence $<q_1,a_1>$ will get a higher score than $<q_1, a_0>$ using the kernel method. In contrast, the opposite case would occur using a similarity score matching $q_1$ with $a_1$ as compared with matching $q_1$ with $a_0$, since both $a_1$ and $a_0$ contain keywords plutocracy from $q_1$. This explains why even a bag-of-words kernel adjusting its weights on question/answer pairs has a better chance to produce better results than a bag-of-words question/answer similarity.

Sentiment Analysis

In sentiment analysis, sentences and documents are classified with respect to sentiments they contain. For example, consider the sentiment classes for the following sentences:

'I would not let my dog stay in this hotel'

'Our dog would have never stayed in this hotel'

'Filthy dirty hotel, like a dog house'

'They would not let my dog stay in this hotel'

'The hotel management did not let me in when I was with my dog'

'We were not allowed to stay there with our dog'

Figure 17:
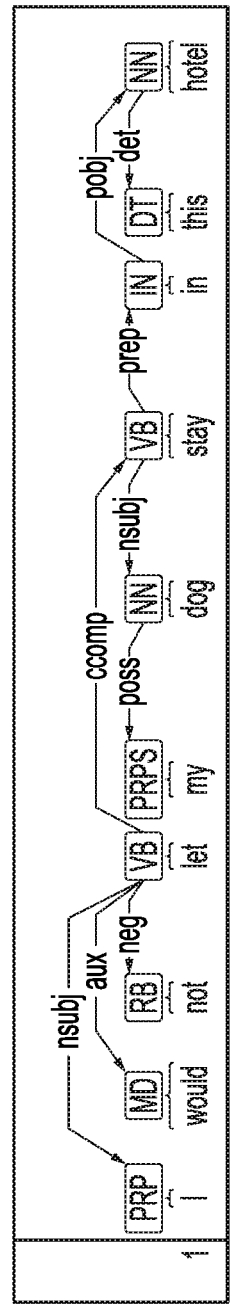
FIG. 17 depicts an exemplary parse tree and RST relations for text, according to certain aspects of the present disclosure.

FIG. 17 depicts an exemplary parse tree and RST relations for text, according to certain aspects of the present disclosure.

As can be observed, polarity is negative in both cases, whereas the topics are totally different.

Topic1='hotel is dirty', and topic2='dogs are not allowed'.

Ascertaining a positive or negative class can be challenging for a keyword-based text classification system, because both classes share the same keywords. Notice these classes are different from the topic3='hotels intended for dogs', polarity='neutral'. If you have never been to a dog hotel, now is the time. It is even harder to perform classification, when information about staying in a hotel and having a dog is spread through different sentences.

Figure 18:
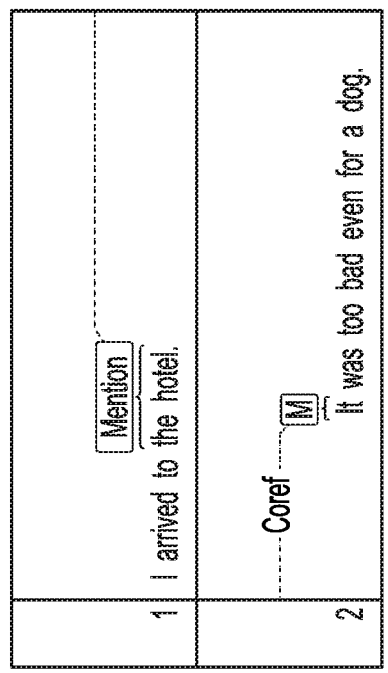
FIG. 18 depicts an exemplary fragment of text for a coreference relation, according to certain aspects of the present disclosure.

FIG. 18 depicts an exemplary fragment of text for a coreference relation, according to certain aspects of the present disclosure. An easier case is depicted in FIG. 18: 'I arrived to the hotel. It was too bad even for a dog."

FIG. 19 depicts an exemplary parse tree and respective relations for two sentences, according to certain aspects of the present disclosure. Another hard case is when rhetoric structure is needed to link information about a hotel and a dog:

'I was traveling for business. My partner invited me to stay at his place, however it looked like a house for dogs.'

'I was traveling with my dog for business. I was not going to stay at a hotel but at my partner's place, however he turned out to be allergic to dogs. Sadly, the hotel did not let us in.'

In the above cases, the parts of the parse trees (sub-trees) essential to determine the meanings occur in different sentences, so needs to be connected. Anaphora is a natural way to do that, but is not always sufficient. Hence we need rhetoric relations to link 'travel, dog owner, hotel' and permission relationships.

Anaphora and Rhetoric Relations for Classification Tasks

Pair-wise comparison of sentences is insufficient to properly learn certain semantic features of text. This is due to the variability of ways information can be communicated in multiple sentences, and variations in possible discourse structures of text which needs to be taken into account.

The following is an example of a text classification problem, where short portions of text belong to two classes, (a) the tax liability of a landlord renting office to a business and (2) the tax liability of a business owner renting an office from landlord.

'I rent an office space. This office is for my business. I can deduct office rental expense from my business profit to calculate net income. To run my business, I have to rent an office. The net business profit is calculated as follows. Rental expense needs to be subtracted from revenue. To store goods for my retail business I rent some space. When I calculate the net income, I take revenue and subtract business expenses such as office rent. I rent out a first floor unit of my house to a travel business. I need to add the rental income to my profit. However, when I repair my house, I can deduct the repair expense from my rental income. I receive rental income from my office. I have to claim it as a profit in my tax forms. I need to add my rental income to my profits, but subtract rental expenses such as repair from it. I advertised my property as a business rental. Advertisement and repair expenses can be subtracted from the rental income. Remaining rental income needs to be added to my profit and be reported as taxable profit.'

Note that keyword-based analysis does not help to separate the first three paragraph and the second three paragraphs. They all share the same keywords rental/office/income/profit/add/subtract. Phrase-based analysis does not help, since both sets of paragraphs share similar phrases.

Secondly, pair-wise sentence comparison does not solve the problem either. Anaphora resolution is helpful but insufficient. All these sentences include 'I' and its mention, but other links between words or phrases in different sentences need to be used.

Rhetoric structures need to come into play to provide additional links between sentences. The structure to distinguish between 'renting for yourself and deducting from total income' and 'renting to someone and adding to income' embraces multiple sentences. The second clause about 'adding/subtracting incomes' is linked by means of the rhetoric relation of elaboration with the first clause for landlord/tenant. This rhetoric relation may link discourse units within a sentence, between consecutive sentences and even between first and third sentence in a paragraph. Other rhetoric relations can play similar role for forming essential links for text classification.

Which representations for these paragraphs of text would produce such common sub-structure between the structures of these paragraphs? We believe that extended trees, which include the first, second, and third sentence for each paragraph together can serve as a structure to differentiate the two above classes.

Figure 20:
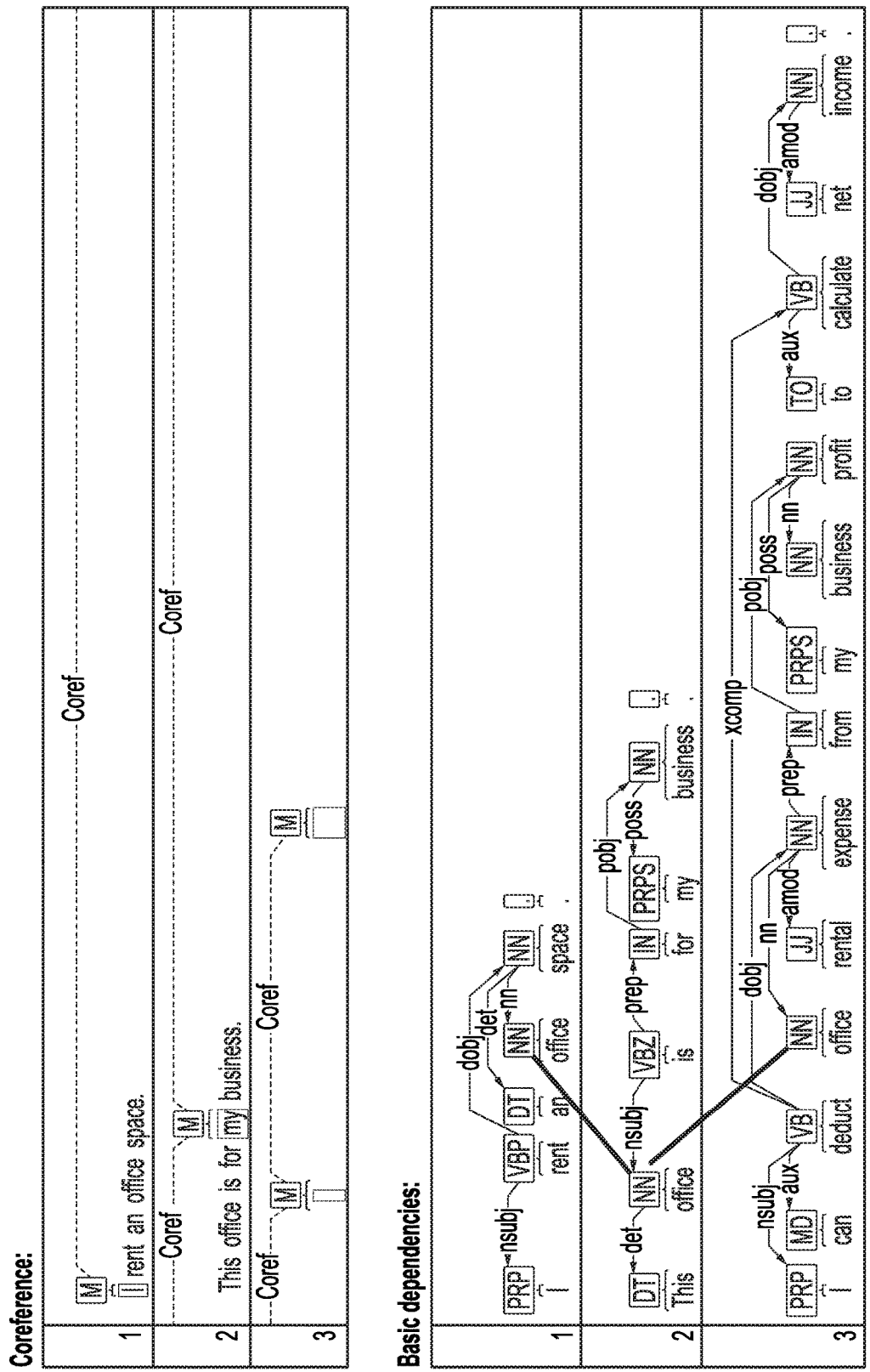
FIG. 20 depicts exemplary coreferences and an exemplary set of dependency trees for text, according to certain aspects of the present disclosure.

FIG. 20 depicts exemplary coreferences and an exemplary set of dependency trees for text, according to certain aspects of the present disclosure. The dependency parse trees for the first text in our set and its coreferences are shown in FIG. 15. There are multiple ways the nodes from parse trees of different sentences can be connected: one approach is to choose the rhetoric relation of elaboration which links the same entity office and helps us to form the structure rent-office-space—for-my-business—deduct-rental-expense which is the base for our classification. See FIGS. 14-15.

Figure 21:
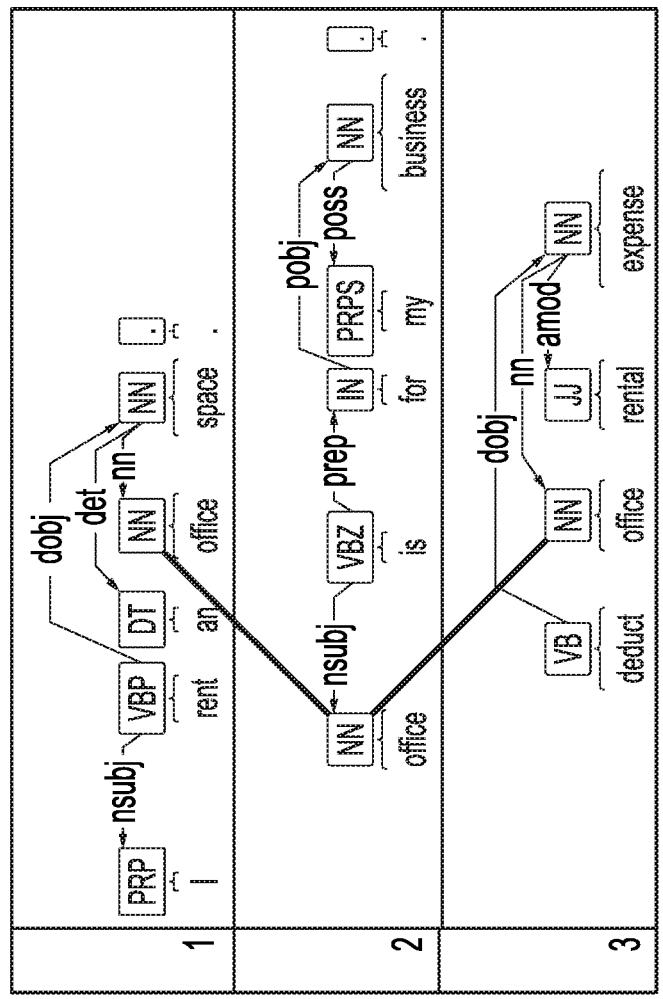
FIG. 21 depicts an exemplary extended tree that represents sentences, according to certain aspects of the present disclosure.

FIG. 21 depicts an exemplary extended tree that represents sentences, according to certain aspects of the present disclosure. FIG. 21 shows the resultant extended tree with the root 'I' from the first sentence. It includes the whole first sentence, a verb phrase from the second sentence and a verb phrase from the third sentence according to rhetoric relation of elaboration. Notice that this extended tree can be intuitively viewed as representing the 'main idea' of this text compared to other texts in our set. All extended trees need to be formed for a text and then compared with that of the other texts, since we don't know in advance which extended tree is essential. From the standpoint of tree kernel learning, extended trees are learned the same way as regular parse trees.

Figure 22:
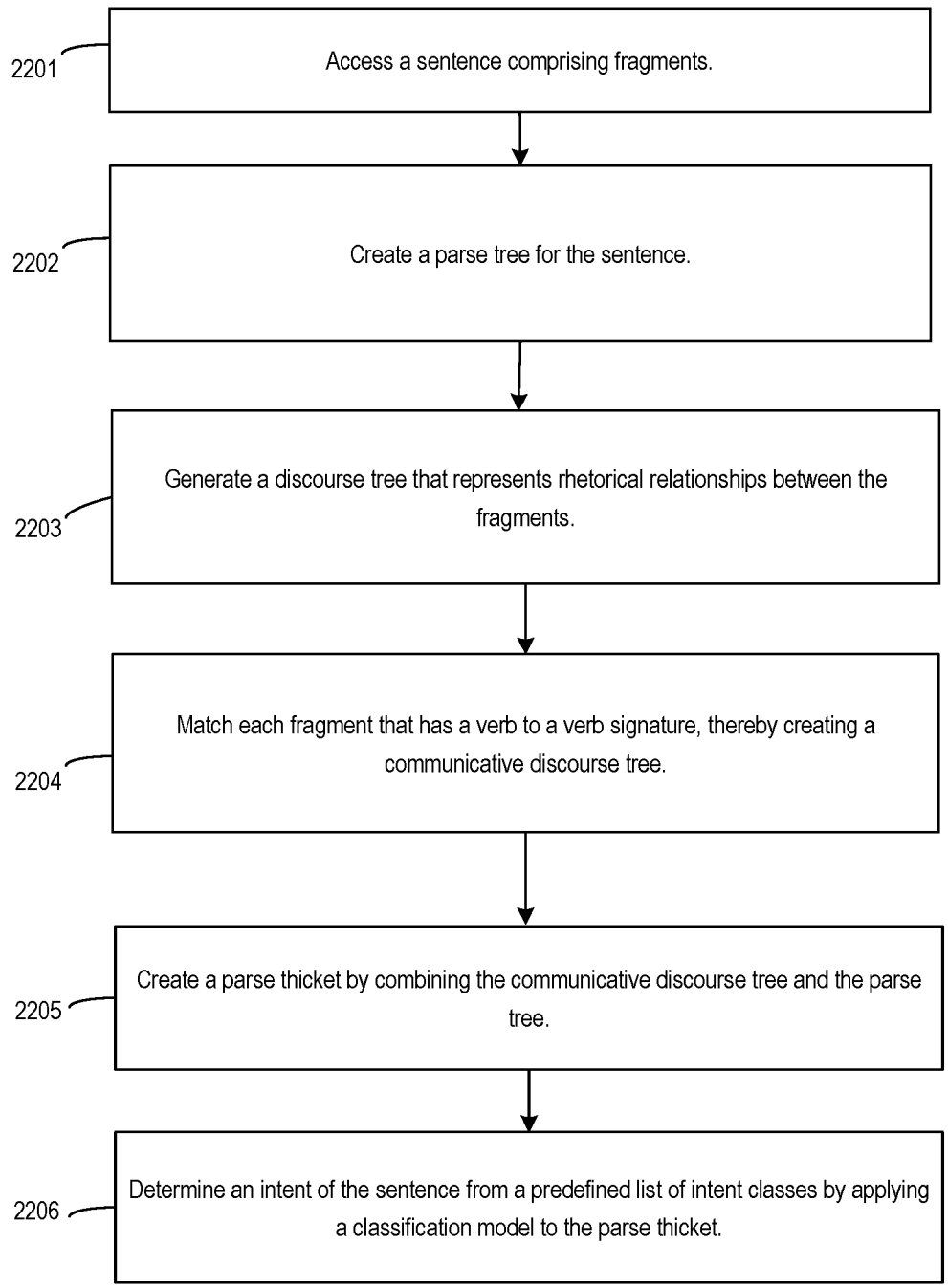
FIG. 22 depicts an exemplary process for determining intent from an utterance, according to certain aspects of the present disclosure.

FIG. 22 depicts an exemplary process 2200 for determining intent from an utterance, according to certain aspects of the present disclosure. An utterance can be any text such as a paragraph, a sentence, or a fragment of a sentence. An utterance can be obtained from a Chatbot application, a chat application, email, a document, or any other source.

At block 2201, process 2000 involves accessing a sentence or an utterance comprising fragments. An example utterance is "Rebels, the self-proclaimed Donetsk People's Republic, deny that they controlled the territory from which the missile was allegedly fired" as described with respect to FIG. 13. Each sentence includes a fragment. Fragments can include a verb and words. Each word includes a role of the word within the fragment and each fragment is an elementary discourse unit. Fragments can include a verb or other words. For example, a first fragment is "rebels . . . deny." A second fragment is "that they controlled the territory." A third fragment is "from which the missile was allegedly fired." Each fragment includes a verb, for example, "deny" for the first fragment and "controlled" for the second fragment. Although, a fragment need not include a verb.

At block 2202, process 2000 involves creating a parse tree for the sentence. The parse tree represents the syntactic structure of the sentence.

At block 2203, process 2000 involves generating a discourse tree that represents rhetorical relationships between the fragments. The discourse tree includes of nodes. Each nonterminal node represents a rhetorical relationship between two fragments. Each terminal node is associated with one of the fragments. Continuing the example, intent classification application 102 generates a discourse tree as shown in FIG. 13. For example, the third fragment, "from which the missile was allegedly fired" elaborates on "that they controlled the territory." The second and third fragments together relate to attribution of what happened, i.e., the attack cannot have been the rebels because they do not control the territory.

At block 2204, process 2000 involves matching each fragment that has a verb to a verb signature, thereby creating a communicative discourse tree. As discussed, each verb signature includes the verb of the fragment and one or more of thematic roles. For example, a signature includes one or more of noun phrase (NP), noun (N), communicative action (V), verb phrase (VP), or adverb (ADV).

The thematic roles describe the relationship between the verb and related words. For example "the teacher amused the children" has a different signature from "small children amuse quickly." A thematic role refers to the role of the verb in the sentence fragment. Intent classification application 102 determines the thematic roles in each verb signature. Example thematic roles include actor, agent, asset, attribute, beneficiary, cause, location destination source, destination, source, location, experiencer, extent, instrument, material and product, material, product, patient, predicate, recipient, stimulus, theme, time, or topic. Intent classification application 102 matches each elementary discourse unit, or fragment, from the sentence that includes a verb to a particular verb signature. To match fragments to verb signatures, intent classification application 102 accesses multiple verb signatures, for example, from VerbNet Intent classification application 102 selects a particular verb signature from the verb signatures based on the particular verb signature having a highest number of matches. For example, referring again to FIG. 13, deny in the first fragment "the rebels deny . . . that they control the territory" is matched to verb signature deny "NP V NP", and "control" is matched to control (rebel, territory). Verb signatures are nested, resulting in a nested signature of "deny(rebel, control (rebel, territory))."

At block 2205, process 2000 involves creating a parse thicket by combining the communicative discourse tree and the parse tree. A parse thicket is a combination of parse trees for sentences with discourse-level relationships between words and parts of the sentence in one graph.

At block 2206, process 2000 determining an output intent 150 of the sentence from a predefined list of intent classes by applying a classification model to the parse thicket. Different classification models can be used. For example, intent classification model 120 can be a support vector machine. The support vector machine can use tree kernel learning. Alternatively, intent classification application 102 can determine a feature vector from the parse thicket, then provide the feature vector to intent classification model 120. Continuing the example, the output intent 150 can be "to defend a position" or "to deflect blame."

Intent classification application 102 can classify on two or more hierarchical levels. For example, after determining an initial class of intent using process 2000, intent classification application 102 can selecting, based on the determined intent, an additional classification model 120 from a set of classification models. Considering a banking example, the first level of classification can determine a high-level intent such as new customer or existing customer. A second classification model can determine whether a user is asking about checking accounts, saving accounts, or investment accounts. For example, intent classification model 120 can determine an additional intent of the sentence from an additional predefined list of intent classes by applying the additional classification model to the parse thicket generated from the sentence. The hierarchical nature of the classes can continue, for example, from a broad class to a narrow class.

Intent classification application 102 can continue to adjust intent classification model 120 over time. For example, intent classification application 102 can receive feedback that a particular classification was erroneous or was successful, and adjust intent classification model 120 accordingly. In this manner, intent classification model 120 improves over time. Adjustment can include minimizing a loss function that is calculated based on a difference between a probability of a particular classification determined by intent classification model 120 and an expected probability of a classification as received by user feedback or a training data pair.

Building Extended Trees

Figure 23:
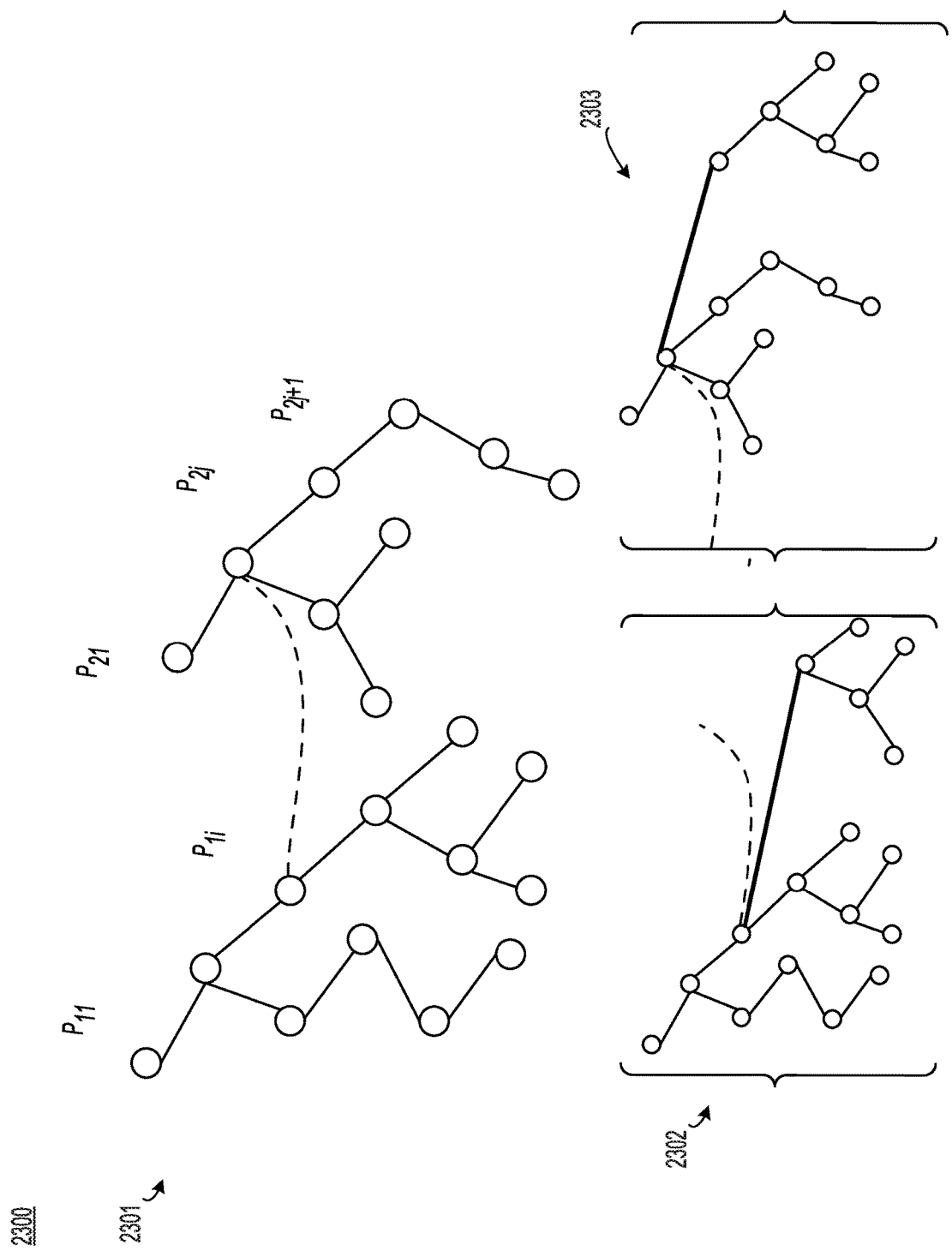
FIG. 23 depicts an exemplary connection of two parse trees and a derived set of sentences, according to certain aspects of the present disclosure.

FIG. 23 depicts an exemplary connection of two parse trees and a derived set of sentences, according to certain aspects of the present disclosure. For every arc which connects two parse trees, we derive the extension of these trees, extending branches according to the arc.

In this approach, for a given parse tree, we will obtain a set of its extension, so the elements of kernel will be computed for many extensions, instead of just a single tree. The problem here is that we need to find common sub-trees for a much higher number of trees than the number of sentences in text, however by sub-tree the number of common sub-trees will be substantially reduced.

An arc which connects two parse trees for two sentences in a text (on the top) and the derived set of extended trees (on the bottom). If we have two parse trees $P_1$ and $P_2$ for two sentences in a paragraph, and a relation $R_{12}: P_{1i} \rightarrow P_{2j}$ between the nodes $P_{1i}$ and $P_{2j}$, we form the pair of extended trees $P_1 * P_2$:

..., $P_{1i-2}$, $P_{1i-1}$, $P_{1i}$, $P_{2j}$, $P_{2j+1}$, $P_{2j+2}$, ...
..., $P_{2j-2}$, $P_{2j-1}$, $P_{2j}$, $P_{1i}$, $P_{1i+1}$, $P_{2i+2}$, ..., which would form the feature set for tree kernel learning in addition to the original trees $P_1$ and $P_2$. Notice that the original order of nodes of parse trees are retained under operation (See FIG. 16).

The algorithm for building an extended tree for a set of parse trees T is presented below:

Input:
1) Set of parse trees T.
2) Set of relations R, which includes relations $R_{ijk}$ between the nodes of $T_i$ and $T_j$: $T_i \in T$, $T_j \in T$, $R_{ijk} \in R$. We use index k to range over multiple relations between the nodes of parse tree for a pair of sentences.

Output: the exhaustive set of extended trees E.
Set E=∅;
For each tree i=1:1
  For each relation $R_{ijk}$, k=1: |R|
  Obtain $T_j$
  Form the pair of extended trees $T_i * T_j$;
  Verify that each of the extended trees do not have a super-tree in E
  If verified, add to E;
Return E.

Notice that the resultant trees are not the proper parse trees for a sentence, but nevertheless form an adequate feature space for tree kernel learning.

To obtain the inter-sentence links, coreferences from Stanford NLP are used. Rhetoric relation extractor based on our rule-based approach to finding relations between elementary discourse units. We combined manual rules with automatically learned rules derived from the available discourse corpus by means of syntactic generalization.

Training

The SVM model is trained prior to use. Training includes positive training, e.g., labeling "plausible" sequences of sentences and negative training, e.g., "implausible." In this manner, the system can determine at runtime the class or intent of a set of sentences based on the model comparing the relationship to known relationships.

Support vector machines (SVMs) are mostly well-known algorithms. The main idea behind SVMs is to learn a hyperplane, e.g.: $H(\vec{x}) = \vec{w} \cdot \vec{x} + b = 0_1$, where $\vec{x}$ is the representation of a classifying object o as a feature vector, while $\vec{w} \in \Re^n$ (indicating that $\vec{w}$ belongs to a vector space of n dimensions built on real numbers) and $b \in \Re$ are parameters learned from training examples by applying the Structural Risk Minimization principle (Vapnik, 1995). Object o is mapped into $\vec{x}$ via a feature function $\phi: \mathcal{O} \rightarrow \Re^n$, where $\mathcal{O}$ is the set of objects; o is categorized in the target class only if $H(\vec{x}) \geq 0$.

The decision hyperplane can be rewritten as:

$$(\vec{x}) = (\Sigma_{i=1}, \quad , y_i x_i \vec{x}_i) \cdot \vec{x} + b = \Sigma_{i=1}, \quad , y_i x_i \vec{x}_i \cdot \vec{x} + b = \Sigma_{i=1}, \quad , y_i x_i \phi(O_i) \cdot \phi(O) + b,$$

where $y_i$ is equal to 1 for positive examples and to −1 for negative examples and where: $x_i \in \Re$ (With $x_i \geq 0$, $o_i$ $\forall i \in \{1, \ldots, 1\}$ are the training instances and $K(o_i, o) = \langle \phi(o_i) \cdot \phi(o_i) \rangle$ is the kernel function associated with the mapping $\phi$.

Convolution kernels as a measure of similarity between trees compute the common sub-trees between two trees $T_1$ and $T_2$. Convolution kernel does not have to compute the whole space of tree fragments. Let the set $T = \{t_1, t_2, \ldots, t_{|T|}\}$ be the set of sub-trees of an extended parse tree, and $c_i(n)$ be an indicator function which is equal to 1 if the subtree $t_i$ is rooted at a node n, and is equal to 0 otherwise. A tree kernel function over trees $T_1$ and $T_2$ is $$TK(T_1 T_2) = \sum_{n_1 \in N_{T_1}} \sum_{n_2 \in N_{T_2}} \Delta(n_1 n_2), \quad (3)$$

where $N_{T1}$ and $N_{T2}$ are the sets of $T_1$'s and $T_2$'s nodes, respectively and $\Delta(n_1 n_2) = \Sigma_{i=1}^{|T|} x_i(n_1) x_i(n_2)$ calculates the number of common fragments with the roots $n_1$ and $n_2$ nodes.

Figure 24:
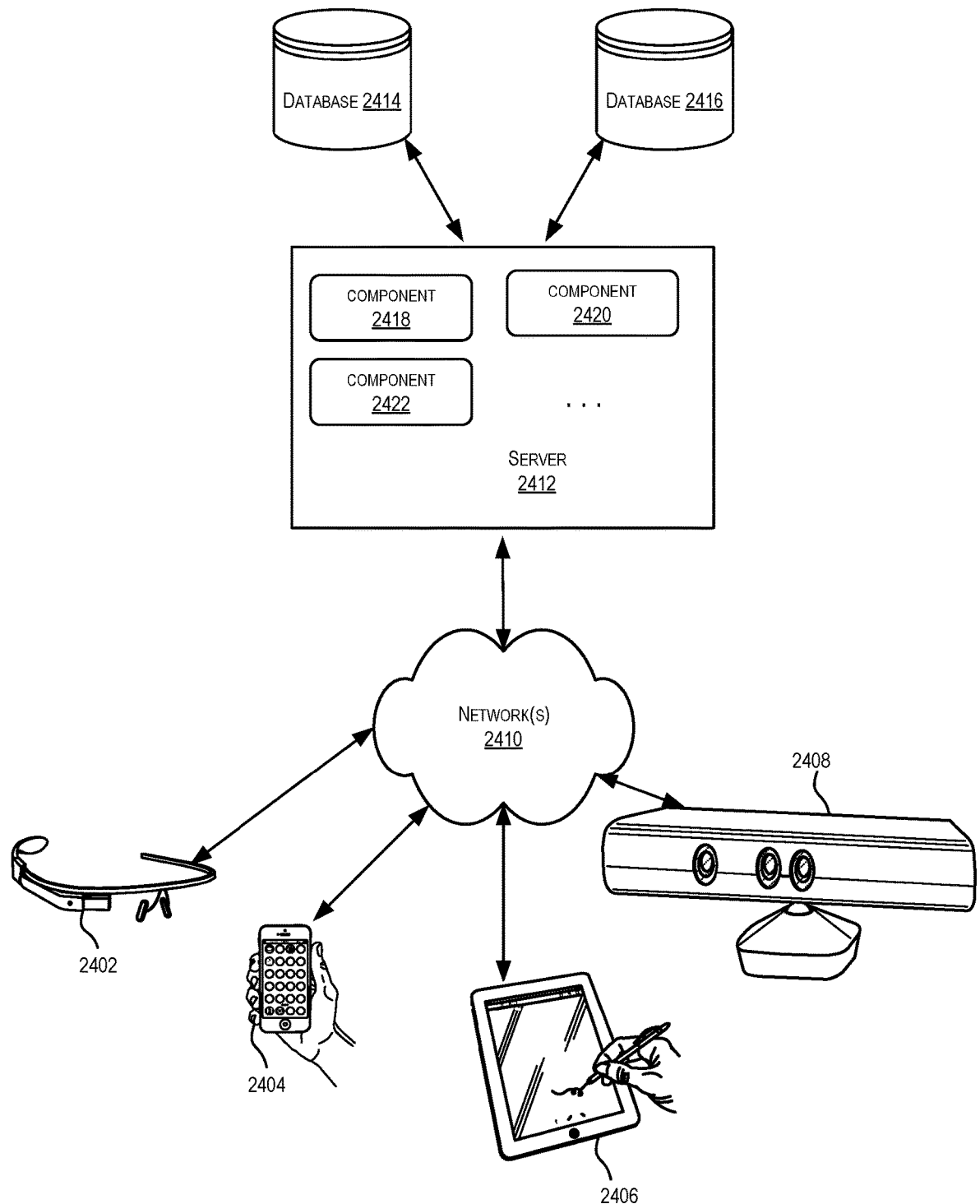
FIG. 24 depicts a simplified diagram of a distributed system for implementing one of the aspects.

FIG. 24 depicts a simplified diagram of a distributed system 2400 for implementing one of the aspects. In the illustrated aspect, distributed system 2400 includes one or more client computing devices 2402, 2404, 2406, and 2408, which are configured to execute and operate a client application such as a web browser, proprietary client (e.g., Oracle Forms), or the like over one or more network(s) 2410. Server 2412 may be communicatively coupled with remote client computing devices 2402, 2404, 2406, and 2408 via network 2410.

In various aspects, server 812 may be adapted to run one or more services or software applications provided by one or more of the components of the system. The services or software applications can include nonvirtual and virtual environments. Virtual environments can include those used for virtual events, tradeshows, simulators, classrooms, shopping exchanges, and enterprises, whether two- or three-dimensional (3D) representations, page-based logical environments, or otherwise. In some aspects, these services may be offered as web-based or cloud services or under a Software as a Service (SaaS) model to the users of client computing devices 2402, 2404, 2406, and/or 2408. Users operating client computing devices 2402, 2404, 2406, and/or 2408 may in turn utilize one or more client applications to interact with server 2412 to utilize the services provided by these components.

In the configuration depicted in the figure, the software components 2418, 2420 and 2422 of system 2400 are shown as being implemented on server 812. In other aspects, one or more of the components of system 2400 and/or the services provided by these components may also be implemented by one or more of the client computing devices 2402, 2404, 2406, and/or 2408. Users operating the client computing devices may then utilize one or more client applications to use the services provided by these components. These components may be implemented in hardware, firmware, software, or combinations thereof. It should be appreciated that various different system configurations are possible, which may be different from distributed system 2400. The aspect shown in the figure is thus one example of a distributed system for implementing an aspect system and is not intended to be limiting.

Client computing devices 2402, 2404, 2406, and/or 2408 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 2402, 2404, 2406, and 2408 may be any other electronic device, such as a thin-client computer, an Internet-enabled gaming system (e.g., a Microsoft Xbox gaming console with or without a Kinect® gesture input device), and/or a personal messaging device, capable of communicating over network(s) 2410.

Although exemplary distributed system 2400 is shown with four client computing devices, any number of client computing devices may be supported. Other devices, such as devices with sensors, etc., may interact with server 2412.

Network(s) 2410 in distributed system 2400 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 2410 can be a local area network (LAN), such as one based on Ethernet, Token-Ring and/or the like. Network(s) 2410 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.24 suite of protocols, Bluetooth®, and/or any other wireless protocol); and/or any combination of these and/or other networks.

Server 2412 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 2412 can include one or more virtual machines running virtual operating systems, or other computing architectures involving virtualization. One or more flexible pools of logical storage devices can be virtualized to maintain virtual storage devices for the server. Virtual networks can be controlled by server 2412 using software defined networking. In various aspects, server 2412 may be adapted to run one or more services or software applications described in the foregoing disclosure. For example, server 2412 may correspond to a server for performing processing described above according to an aspect of the present disclosure.

Server 2412 may run an operating system including any of those discussed above, as well as any commercially available server operating system. Server 2412 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 2412 may include one or more applications to analyze and consolidate data feeds and/or event updates received from users of client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 2412 may also include one or more applications to display the data feeds and/or real-time events via one or more display devices of client computing devices 2402, 2404, 2406, and 2408.

Distributed system 2400 may also include one or more databases 2414 and 2416. Databases 2414 and 2416 may reside in a variety of locations. By way of example, one or more of databases 2414 and 2416 may reside on a non-transitory storage medium local to (and/or resident in) server 2412. Alternatively, databases 2414 and 2416 may be remote from server 2412 and in communication with server 2412 via a network-based or dedicated connection. In one set of aspects, databases 2414 and 2416 may reside in a storage-area network (SAN). Similarly, any necessary files for performing the functions attributed to server 2412 may be stored locally on server 2412 and/or remotely, as appropriate. In one set of aspects, databases 2414 and 2416 may include relational databases, such as databases provided by Oracle, that are adapted to store, update, and retrieve data in response to SQL-formatted commands.

Figure 25:
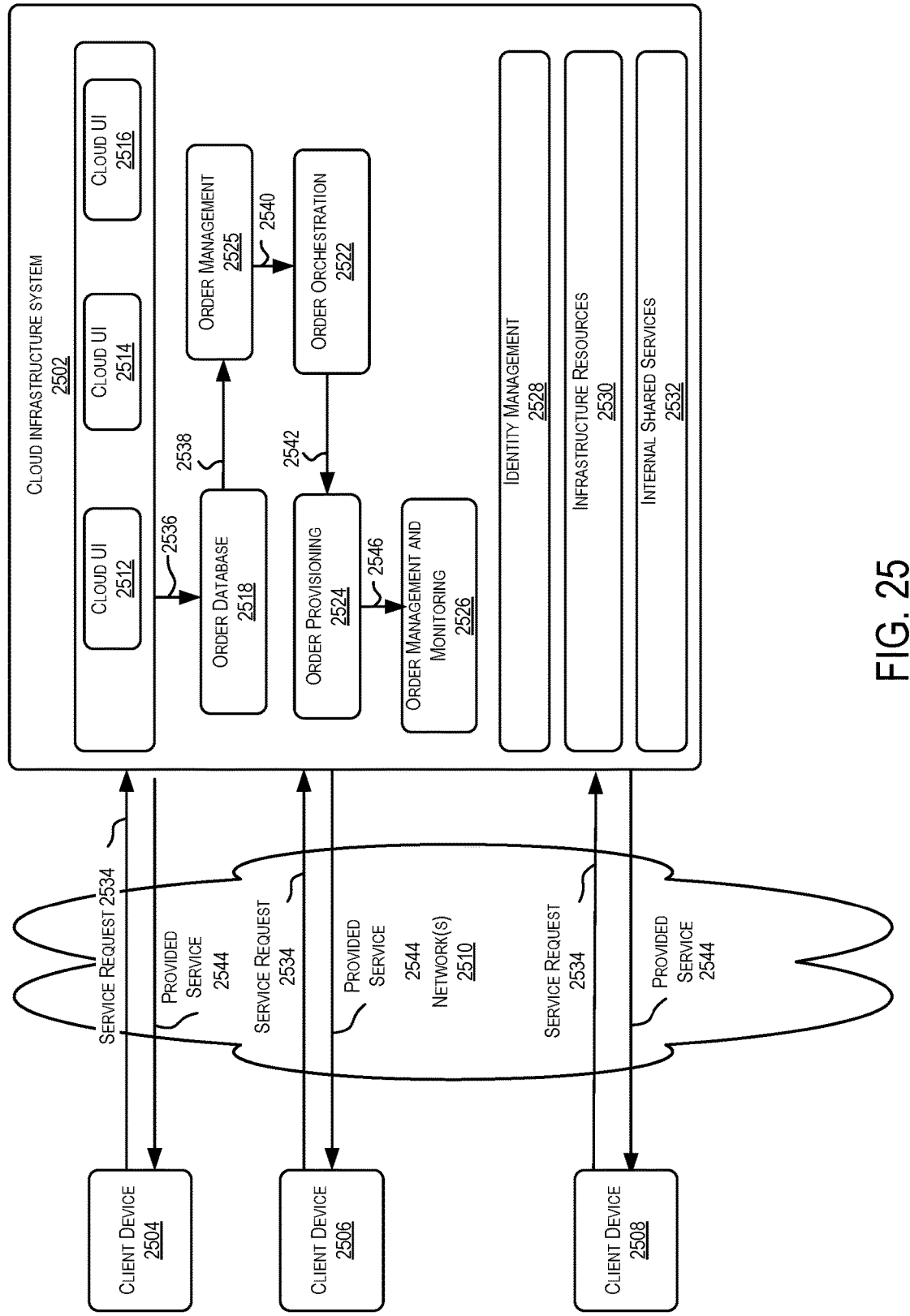
FIG. 25 is a simplified block diagram of components of a system environment by which services provided by the components of an aspect system may be offered as cloud services in accordance with an aspect.

FIG. 25 is a simplified block diagram of one or more components of a system environment 2500 by which services provided by one or more components of an aspect system may be offered as cloud services, in accordance with an aspect of the present disclosure. In the illustrated aspect, system environment 2500 includes one or more client computing devices 2504, 2506, and 2508 that may be used by users to interact with a cloud infrastructure system 2502 that provides cloud services. The client computing devices may be configured to operate a client application such as a web browser, a proprietary client application (e.g., Oracle Forms), or some other application, which may be used by a user of the client computing device to interact with cloud infrastructure system 2502 to use services provided by cloud infrastructure system 2502.

It should be appreciated that cloud infrastructure system 2502 depicted in the figure may have other components than those depicted. Further, the aspect shown in the figure is only one example of a cloud infrastructure system that may incorporate an aspect of the invention. In some other aspects, cloud infrastructure system 2502 may have more or fewer components than shown in the figure, may combine two or more components, or may have a different configuration or arrangement of components.

Client computing devices 2504, 2506, and 2508 may be devices similar to those described above for 2802, 2804, 2806, and 2808.

Although exemplary system environment 2500 is shown with three client computing devices, any number of client computing devices may be supported. Other devices such as devices with sensors, etc. may interact with cloud infrastructure system 2502.

Network(s) 2510 may facilitate communications and exchange of data between clients 2504, 2506, and 2508 and cloud infrastructure system 2502. Each network may be any type of network familiar to those skilled in the art that can support data communications using any of a variety of commercially-available protocols, including those described above for network(s) 2810.

Cloud infrastructure system 2502 may comprise one or more computers and/or servers that may include those described above for server 2825.

In certain aspects, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain aspects, cloud infrastructure system 2502 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Large volumes of data, sometimes referred to as big data, can be hosted and/or manipulated by the infrastructure system on many levels and at different scales. Such data can include data sets that are so large and complex that it can be difficult to process using typical database management tools or traditional data processing applications. For example, terabytes of data may be difficult to store, retrieve, and process using personal computers or their rack-based counterparts. Such sizes of data can be difficult to work with using most current relational database management systems and desktop statistics and visualization packages. They can require massively parallel processing software running thousands of server computers, beyond the structure of commonly used software tools, to capture, curate, manage, and process the data within a tolerable elapsed time.

Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an aspect to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various aspects, cloud infrastructure system 2502 may be adapted to automatically provision, manage and track a customer's subscription to services offered by cloud infrastructure system 2502. Cloud infrastructure system 2502 may provide the cloud services via different deployment models. For example, services may be provided under a public cloud model in which cloud infrastructure system 2502 is owned by an organization selling cloud services (e.g., owned by Oracle) and the services are made available to the general public or different industry enterprises. As another example, services may be provided under a private cloud model in which cloud infrastructure system 2502 is operated solely for a single organization and may provide services for one or more entities within the organization. The cloud services may also be provided under a community cloud model in which cloud infrastructure system 2502 and the services provided by cloud infrastructure system 2502 are shared by several organizations in a related community. The cloud services may also be provided under a hybrid cloud model, which is a combination of two or more different models.

In some aspects, the services provided by cloud infrastructure system 2502 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 2502. Cloud infrastructure system 2502 then performs processing to provide the services in the customer's subscription order.

In some aspects, the services provided by cloud infrastructure system 2502 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some aspects, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some aspects, platform services provided by the cloud infrastructure system may include database cloud services, middleware cloud services (e.g., Oracle Fusion Middleware services), and Java cloud services. In one aspect, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain aspects, cloud infrastructure system 2502 may also include infrastructure resources 2530 for providing the resources used to provide various services to customers of the cloud infrastructure system. In one aspect, infrastructure resources 2530 may include pre-integrated and optimized combinations of hardware, such as servers, storage, and networking resources to execute the services provided by the PaaS platform and the SaaS platform.

In some aspects, resources in cloud infrastructure system 2502 may be shared by multiple users and dynamically re-allocated per demand. Additionally, resources may be allocated to users in different time zones. For example, cloud infrastructure system 2530 may enable a first set of users in a first time zone to utilize resources of the cloud infrastructure system for a specified number of hours and then enable the re-allocation of the same resources to another set of users located in a different time zone, thereby maximizing the utilization of resources.

In certain aspects, a number of internal shared services 2532 may be provided that are shared by different components or modules of cloud infrastructure system 2502 and by the services provided by cloud infrastructure system 2502. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain aspects, cloud infrastructure system 2502 may provide comprehensive management of cloud services (e.g., SaaS, PaaS, and IaaS services) in the cloud infrastructure system. In one aspect, cloud management functionality may include capabilities for provisioning, managing and tracking a customer's subscription received by cloud infrastructure system 2502, and the like.

In one aspect, as depicted in the figure, cloud management functionality may be provided by one or more modules, such as an order management module 2525, an order orchestration module 2522, an order provisioning module 2525, an order management and monitoring module 2526, and an identity management module 2528. These modules may include or be provided using one or more computers and/or servers, which may be general purpose computers, specialized server computers, server farms, server clusters, or any other appropriate arrangement and/or combination.

In exemplary operation 2534, a customer using a client device, such as client device 2504, 2506 or 2508, may interact with cloud infrastructure system 2502 by requesting one or more services provided by cloud infrastructure system 2502 and placing an order for a subscription for one or more services offered by cloud infrastructure system 2502. In certain aspects, the customer may access a cloud User Interface (UI), cloud UI 2525, cloud UI 2514 and/or cloud UI 2516 and place a subscription order via these UIs. The order information received by cloud infrastructure system 2502 in response to the customer placing an order may include information identifying the customer and one or more services offered by the cloud infrastructure system 2502 that the customer intends to subscribe to.

After an order has been placed by the customer, the order information is received via the cloud UIs, 2525, 2514 and/or 2516.

At operation 2536, the order is stored in order database 2518. Order database 2518 can be one of several databases operated by cloud infrastructure system 2518 and operated in conjunction with other system elements.

At operation 2538, the order information is forwarded to an order management module 2525. In some instances, order management module 2525 may be configured to perform billing and accounting functions related to the order, such as verifying the order, and upon verification, booking the order.

At operation 2540, information regarding the order is communicated to an order orchestration module 2522. Order orchestration module 2522 may utilize the order information to orchestrate the provisioning of services and resources for the order placed by the customer. In some instances, order orchestration module 2522 may orchestrate the provisioning of resources to support the subscribed services using the services of order provisioning module 2525.

In certain aspects, order orchestration module 2522 enables the management of business processes associated with each order and applies business logic to determine whether an order should proceed to provisioning. At operation 2542, upon receiving an order for a new subscription, order orchestration module 2522 sends a request to order provisioning module 2525 to allocate resources and configure those resources needed to fulfill the subscription order. Order provisioning module 2525 enables the allocation of resources for the services ordered by the customer. Order provisioning module 2525 provides a level of abstraction between the cloud services provided by cloud infrastructure system 2500 and the physical implementation layer that is used to provision the resources for providing the requested services. Order orchestration module 2522 may thus be isolated from implementation details, such as whether or not services and resources are actually provisioned on the fly or pre-provisioned and only allocated/assigned upon request.

At operation 2544, once the services and resources are provisioned, a notification of the provided service may be sent to customers on client devices 2504, 2506 and/or 2508 by order provisioning module 2525 of cloud infrastructure system 2502.

At operation 2546, the customer's subscription order may be managed and tracked by an order management and monitoring module 2526. In some instances, order management and monitoring module 2526 may be configured to collect usage statistics for the services in the subscription order, such as the amount of storage used, the amount data transferred, the number of users, and the amount of system up time and system down time.

In certain aspects, cloud infrastructure system 2500 may include an identity management module 2528. Identity management module 2528 may be configured to provide identity services, such as access management and authorization services in cloud infrastructure system 2500. In some aspects, identity management module 2528 may control information about customers who wish to utilize the services provided by cloud infrastructure system 2502. Such information can include information that authenticates the identities of such customers and information that describes which actions those customers are authorized to perform relative to various system resources (e.g., files, directories, applications, communication ports, memory segments, etc.) Identity management module 2528 may also include the management of descriptive information about each customer and about how and by whom that descriptive information can be accessed and modified.

Figure 26:
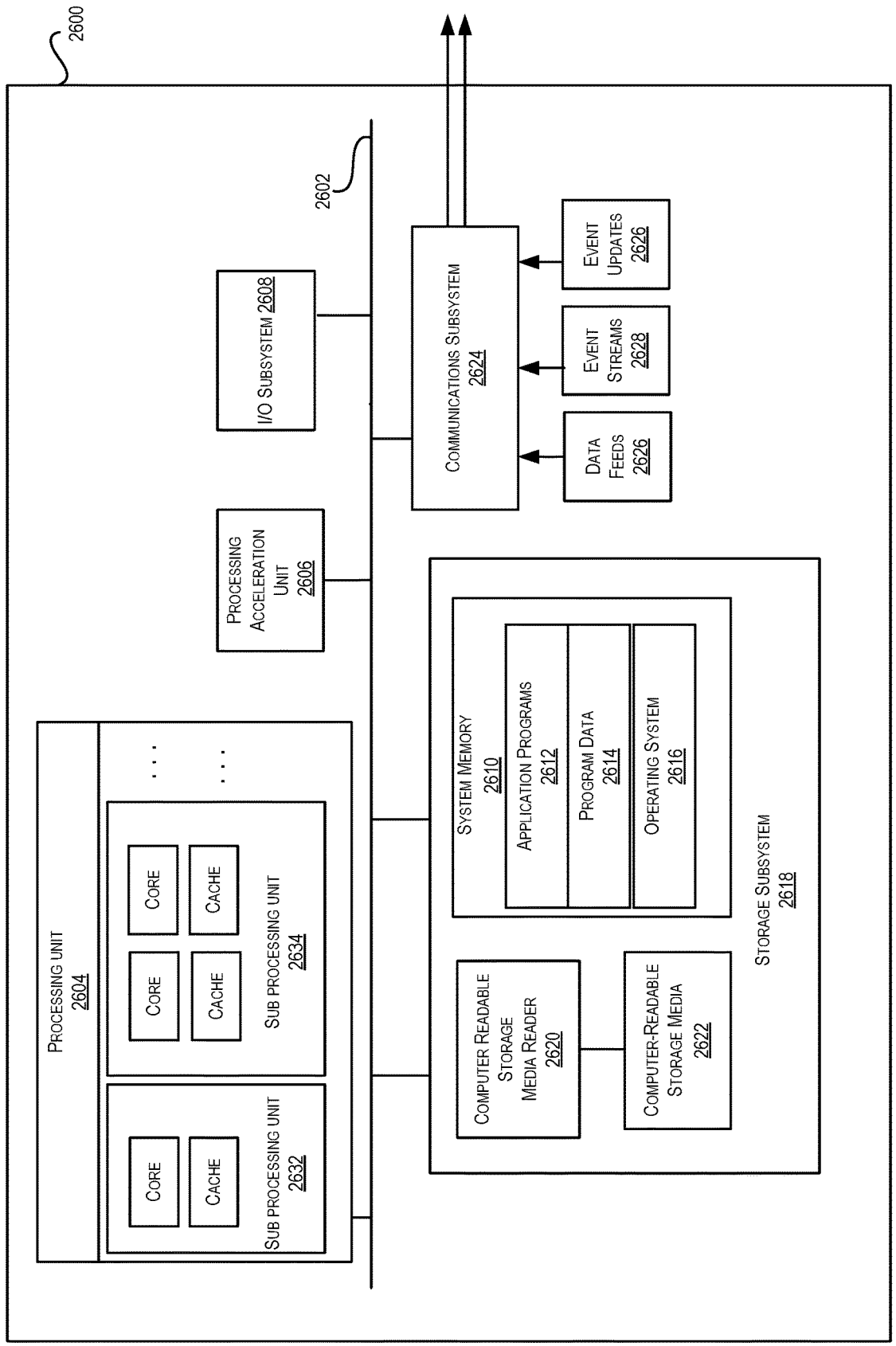
FIG. 26 illustrates an exemplary computer system, in which various aspects of the present invention may be implemented.

FIG. 26 illustrates an exemplary computer system 2600, in which various aspects of the present invention may be implemented. The system 2600 may be used to implement any of the computer systems described above. As shown in the figure, computer system 2600 includes a processing unit 2604 that communicates with a number of peripheral subsystems via a bus subsystem 2602. These peripheral subsystems may include a processing acceleration unit 2606, an I/O subsystem 2608, a storage subsystem 2618 and a communications subsystem 2624.

Storage subsystem 2618 includes tangible computer-readable storage media 2622 and a system memory 2610.

Bus subsystem 2602 provides a mechanism for letting the various components and subsystems of computer system 2600 communicate with each other as intended. Although bus subsystem 2602 is shown schematically as a single bus, alternative aspects of the bus subsystem may utilize multiple buses. Bus subsystem 2602 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P2686.1 standard.

Processing unit 2604, which can be implemented as one or more integrated circuits (e.g., a conventional microprocessor or microcontroller), controls the operation of computer system 2600. One or more processors may be included in processing unit 2604. These processors may include single core or multicore processors. In certain aspects, processing unit 2604 may be implemented as one or more independent processing units 2632 and/or 2634 with single or multicore processors included in each processing unit. In other aspects, processing unit 2604 may also be implemented as a quad-core processing unit formed by integrating two dual-core processors into a single chip.

In various aspects, processing unit 2604 can execute a variety of programs in response to program code and can maintain multiple concurrently executing programs or processes. At any given time, some or all of the program code to be executed can be resident in processor(s) 2604 and/or in storage subsystem 2618. Through suitable programming, processor(s) 2604 can provide various functionalities described above. Computer system 2600 may additionally include a processing acceleration unit 2606, which can include a digital signal processor (DSP), a special-purpose processor, and/or the like.

I/O subsystem 2608 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2600 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2600 may comprise a storage subsystem 2618 that comprises software elements, shown as being currently located within a system memory 2610. System memory 2610 may store program instructions that are loadable and executable on processing unit 2604, as well as data generated during the execution of these programs.

Depending on the configuration and type of computer system 2600, system memory 2610 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 2604. In some implementations, system memory 2610 may include multiple different types of memory, such as static random access memory (SRAM) or dynamic random access memory (DRAM). In some implementations, a basic input/output system (BIOS), containing the basic routines that help to transfer information between elements within computer system 2600, such as during start-up, may typically be stored in the ROM. By way of example, and not limitation, system memory 2610 also illustrates application programs 2612, which may include client applications, Web browsers, mid-tier applications, relational database management systems (RDBMS), etc., program data 2614, and an operating system 2616. By way of example, operating system 2616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 2618 may also provide a tangible computer-readable storage medium for storing the basic programming and data constructs that provide the functionality of some aspects. Software (programs, code modules, instructions) that when executed by a processor provide the functionality described above may be stored in storage subsystem 2618. These software modules or instructions may be executed by processing unit 2604. Storage subsystem 2618 may also provide a repository for storing data used in accordance with the present invention.

Storage subsystem 2600 may also include a computer-readable storage media reader 2620 that can further be connected to computer-readable storage media 2622. Together and, optionally, in combination with system memory 2610, computer-readable storage media 2622 may comprehensively represent remote, local, fixed, and/or removable storage devices plus storage media for temporarily and/or more permanently containing, storing, transmitting, and retrieving computer-readable information.

Computer-readable storage media 2622 containing code, or portions of code, can also include any appropriate media known or used in the art, including storage media and communication media, such as but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing system 2600.

By way of example, computer-readable storage media 2622 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2622 may include, but is not limited to, Zip® drives, flash memory cards, universal serial bus (USB) flash drives, secure digital (SD) cards, DVD disks, digital video tape, and the like. Computer-readable storage media 2622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 2600.

Communications subsystem 2624 provides an interface to other computer systems and networks. Communications subsystem 2624 serves as an interface for receiving data from and transmitting data to other systems from computer system 2600. For example, communications subsystem 2624 may enable computer system 2600 to connect to one or more devices via the Internet. In some aspects, communications subsystem 2624 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.28 family standards, or other mobile communication technologies, or any combination thereof), global positioning system (GPS) receiver components, and/or other components. In some aspects, communications subsystem 2624 can provide wired network connectivity (e.g., Ethernet) in addition to or instead of a wireless interface.

In some aspects, communications subsystem 2624 may also receive input communication in the form of structured and/or unstructured data feeds 2626, event streams 2628, event updates 2626, and the like on behalf of one or more users who may use computer system 2600.

By way of example, communications subsystem 2624 may be configured to receive unstructured data feeds 2626 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 2624 may also be configured to receive data in the form of continuous data streams, which may include event streams 2628 of real-time events and/or event updates 2626, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 2624 may also be configured to output the structured and/or unstructured data feeds 2626, event streams 2628, event updates 2626, and the like to one or more databases that may be in communication with one or more streaming data source computers coupled to computer system 2600.

Computer system 2600 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 2600 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various aspects.

In the foregoing specification, aspects of the invention are described with reference to specific aspects thereof, but those skilled in the art will recognize that the invention is not limited thereto. Various features and aspects of the above-described invention may be used individually or jointly. Further, aspects can be utilized in any number of environments and applications beyond those described herein without departing from the broader spirit and scope of the specification. The specification and drawings are, accordingly, to be regarded as illustrative rather than restrictive.

What is claimed is:

1. A method for determining an intent of an utterance, comprising:
    obtaining a classification model to identify an intent output from input data, the classification model being trained utilising a training set comprising a plurality of examples, the plurality of examples individually comprising i) a corresponding parse thicket for an example sentence with a respective intent and ii) an additional example sentence that fails to exemplify the respective intent;
    obtaining the utterance comprising a plurality of fragments, wherein at least one fragment comprises a verb and a plurality of words, wherein each fragment is an elementary discourse unit;
    creating a parse tree for the utterance;
    generating a discourse tree that represents rhetorical relationships between the plurality of fragments, wherein the discourse tree comprises a plurality of nodes, each nonterminal node representing a rhetorical relationship between two of the plurality of fragments, each terminal node of the nodes of the discourse tree is associated with one of the plurality of fragments;
    matching each fragment that has a verb to a verb signature, thereby creating a communicative discourse tree;
    creating a parse thicket by combining the communicative discourse tree and the parse tree; and
    determining the intent of the utterance based at least in part on providing the parse thicket to the classification model as input and receiving output from the classification model indicating the intent of the utterance.

2. The method of claim 1, further comprising:
    selecting, based on the determined intent, an additional classification model from a plurality of classification models; and
    determining an additional intent of the utterance from an additional predefined list of intent classes by applying the additional classification model to the parse thicket.

3. The method of claim 1, further comprising:
    receiving, from a user device, an indication that the determined intent is incorrect;
    creating a training pair comprising the utterance and an expected intent; and
    re-training the classification model by applying the training pair to the classification model.

4. The method of claim 1, wherein the classification model is a support vector machine.

5. The method of claim 4, wherein the classification model is a support vector machine using tree-kernel learning.

6. The method of claim 1, further comprising:
    training a classification model by iteratively:
        providing, the classification model, a training pair from a training set comprising a set of training pairs, wherein each training pair is associated with an intent and includes a parse thicket for a sentence with the respective intent and a second sentence without the respective intent;
        receiving, from the classification model, a probability;
        calculating a loss function by calculating a difference between the probability and the respective expected probability; and
        adjusting internal parameters of the classification model to minimize the loss function.

7. A system comprising:
    a computer-readable medium storing non-transitory computer-executable program instructions for determining an intent of an utterance; and
    a processing device communicatively coupled to the computer-readable medium for executing the non-transitory computer-executable program instructions, wherein executing the non-transitory computer-executable program instructions configures the processing device to perform operations comprising:
        obtaining a classification model to identify an intent output from input data, the classification model being trained utilising a training set comprising a plurality of examples, the plurality of examples individually comprising i) a corresponding parse thicket for an example sentence with a respective intent and ii) an additional example sentence that fails to exemplify the respective intent;
        obtaining the utterance comprising a plurality of fragments, wherein at least one fragment comprises a verb and a plurality of words, wherein each fragment is an elementary discourse unit;

creating a parse tree for the utterance;
generating a discourse tree that represents rhetorical relationships between the plurality of fragments, wherein the discourse tree comprises a plurality of nodes, each nonterminal node representing a rhetorical relationship between two of the plurality of fragments, each terminal node of the nodes of the discourse tree is associated with one of the plurality of fragments;
matching each fragment that has a verb to a verb signature, thereby creating a communicative discourse tree;
creating a parse thicket by combining the communicative discourse tree and the parse tree; and
determining the intent of the utterance based at least in part on providing the parse thicket to the classification model as input and receiving output from the classification model indicating the intent of the utterance.

8. The system of claim 7, the operations further comprising:
selecting, based on the determined intent, an additional classification model from a hierarchy of classification models; and
determining an additional intent of the utterance from an additional predefined list of intent classes by applying the additional classification model to the parse thicket.

9. The system of claim 7, the operations further comprising:
receiving, from a user device, an indication that the determined intent is incorrect;
creating a training pair comprising the utterance and an expected intent; and
re-training the classification model by applying the training pair to the classification model.

10. The system of claim 7, wherein the classification model is a support vector machine.

11. The system of claim 7, wherein the classification model is a support vector machine using tree-kernel learning.

12. The system of claim 7, the operations further comprising:
training a classification model by iteratively:
providing, the classification model, a training pair from a training set comprising a set of training pairs, wherein each training pair is associated with an intent and includes (i) a parse thicket for a first sentence that comprises the respective intent and a second sentence without the respective intent and (ii) an expected probability;
receiving, from the classification model, a probability;
calculating a loss function by calculating a difference between the probability and the respective expected probability; and
adjusting internal parameters of the classification model to minimize the loss function.

13. The method of claim 1, further comprising:
receiving, from an external device, an indication of a correctness of the intent identified by the classification model; and
adjusting internal parameters of the classification model based on the indication.

14. The method of claim 1, wherein the classification model has been trained by:
providing at least one of the plurality of examples to the classification model;
receiving, from the classification model, a probability that the provided example has a particular intent;
calculating a loss function by calculating a difference between the probability and an expected probability; and
adjusting internal parameters of the classification model to minimize the loss function.

15. The method of claim 3, wherein the training pair further comprises the parse thicket.

16. The system of claim 7, the operations further comprising:
receiving, from an external device, an indication of a correctness of the intent identified by the classification model; and
adjusting internal parameters of the classification model based on the indication.

17. The system of claim 7, wherein the classification model has been trained by:
providing at least one of the plurality of examples to the classification model;
receiving, from the classification model, a probability that the provided example has a particular intent;
calculating a loss function by calculating a difference between the probability and an expected probability; and
adjusting internal parameters of the classification model to minimize the loss function.

18. The system of claim 9, wherein the training pair further comprises the parse thicket.

* * * * *

UNITED STATES PATENT AND TRADEMARK OFFICE
CERTIFICATE OF CORRECTION

PATENT NO.        : 10,839,161 B2
APPLICATION NO.   : 16/010141
DATED             : November 17, 2020
INVENTOR(S)       : Galitsky It is certified that error appears in the above-identified patent and that said Letters Patent is hereby corrected as shown below:

On the Title Page

On page 2, Column 2, under Other Publications, Line 43, delete "Litte" and insert -- Little --, therefor.

On page 2, Column 2, under Other Publications, Line 45, delete "Belts ," and insert -- Belis , --, therefor.

On page 2, Column 2, under Other Publications, Line 53, delete "et al" and insert -- et al., --, therefor.

On page 3, Column 1, under Other Publications, Line 48, delete "7'h" and insert -- 7th --, therefor.

On page 3, Column 2, under Other Publications, Line 55, delete "HL T" and insert -- HLT --, therefor.

On page 4, Column 2, under Other Publications, Line 7, delete "ATNmodel)." and insert
-- ATN model). --, therefor.

On page 4, Column 2, under Other Publications, Lines 54-55, delete "Spring Science + Business Mediak LLC," and insert -- Springer Science + Business Media LLC, --, therefor.

On page 4, Column 2, under Other Publications, Line 60, delete "48'h" and insert -- 48th --, therefor.

In the Drawings

On sheet 14 of 26, in FIG. 14, Line 3, delete "foruser" and insert -- for user --, therefor.

On sheet 14 of 26, in FIG. 14, Line 6, delete "forthe" and insert -- for the --, therefor.

On sheet 14 of 26, in FIG. 14, Line 12, delete "Futhermore" and insert -- Furthermore --, therefor.

On sheet 14 of 26, in FIG. 14, Line 15, delete "useby" and insert -- use by --, therefor.

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,839,161 B2

On sheet 15 of 26, in FIG. 15, Line 9, delete "Tavistok" and insert -- Tavistock --, therefor.

In the Specification

In Column 7, Line 55, after "in" insert -- the --.

In Column 7, Line 55, after "situation or" delete "the".

In Column 8, Line 56, delete "History" and insert -- History. --, therefor.

In Column 8, Line 58, delete "attend" and insert -- attend. --, therefor.

In Column 8, Line 60, delete "Hawaii" and insert -- Hawaii. --, therefor.

In Column 14, Line 56, delete "S O." and insert -- SO. --, therefor.

In Column 15, Line 52, delete "2008." and insert -- 2008, --, therefor.

In Column 17, Lines 15-16, delete "Experiencer):" and insert -- Experiencer):. --, therefor.

In Column 17, Line 20, delete "Experiencer):" and insert -- Experiencer):. --, therefor.

In Column 18, Line 62, delete "Tavistok" and insert -- Tavistock --, therefor.

In Column 19, Line 17, delete "What" and insert -- 'What --, therefor.

In Column 22, Line 18, delete "VerbNet" and insert -- VerbNet. --, therefor.

In Column 23, Line 29, after "operation" insert -- '*' --.

In Column 24, Line 15, delete "(With" and insert -- (with --, therefor.

In Column 31, Lines 57-58, delete "Storage subsystem 2618 includes tangible computer-readable storage media 2622 and a system memory 2610." and insert the same on Column 31, Line 56 as a continuation of the same paragraph.